United States Patent
Yoshida

(10) Patent No.: US 9,874,753 B2
(45) Date of Patent: Jan. 23, 2018

(54) DISPLAY APPARATUS

(71) Applicant: Sony Corporation, Tokyo (JP)

(72) Inventor: Takaaki Yoshida, Kanagawa (JP)

(73) Assignee: Sony Corporation, Tokyo (JP)

(*) Notice: Subject to any disclaimer, the term of this patent is extended or adjusted under 35 U.S.C. 154(b) by 52 days.

(21) Appl. No.: 14/565,114

(22) Filed: Dec. 9, 2014

(65) Prior Publication Data

US 2015/0085372 A1 Mar. 26, 2015

Related U.S. Application Data

(63) Continuation of application No. 14/026,503, filed on Sep. 13, 2013, now Pat. No. 8,934,175, which is a
(Continued)

(30) Foreign Application Priority Data

Feb. 10, 2011 (JP) ................. 2011-027930

(51) Int. Cl.
*G02B 27/01* (2006.01)
*G02B 27/10* (2006.01)
(Continued)

(52) U.S. Cl.
CPC ..... *G02B 27/0176* (2013.01); *G02B 27/0149* (2013.01); *G02B 27/0172* (2013.01);
(Continued)

(58) Field of Classification Search
CPC .. G02B 6/00; G02B 27/0179; G02B 27/0172; G02B 27/108; G02B 27/145;
(Continued)

(56) References Cited

U.S. PATENT DOCUMENTS 4,787,729 A * 11/1988 Ruffen ................. G02C 5/126
351/131
5,739,797 A * 4/1998 Karasawa ............ G02B 27/017
345/8
(Continued)

FOREIGN PATENT DOCUMENTS

CN 101655605 2/2010
JP H09-197335 7/1997

OTHER PUBLICATIONS

Official Action (with English translation) for Chinese Patent Application No. 201210016908.2 dated Jan. 28, 2015, 19 pages.

*Primary Examiner* — Ricky Mack
*Assistant Examiner* — Gary O'Neill
(74) *Attorney, Agent, or Firm* — Sheridan Ross P.C.

(57) ABSTRACT

A display apparatus includes: an eyeglass-type frame worn by a head of a viewer; and an image display apparatus attached to the frame, wherein the image display apparatus includes an image formation device, and an optical device on which light that exits from the image formation device is incident, through which the light is guided, and out of which the light exits, the frame is formed of a front portion, two temple portions extending from both ends of the front portion, a nose pad, and an attachment member, the attachment member is attached to a central section of the front portion, the optical device is attached to the attachment member, and the nose pad is so attached to the attachment member that the nose pad is movable upward and downward.

14 Claims, 14 Drawing Sheets

Related U.S. Application Data continuation of application No. 13/364,103, filed on Feb. 1, 2012, now Pat. No. 8,556,414.

(51) Int. Cl.
    *G02B 6/00*         (2006.01)
    *G02B 27/14*       (2006.01)
    *G02B 27/42*       (2006.01)

(52) U.S. Cl.
    CPC ....... *G02B 27/0179* (2013.01); *G02B 27/108* (2013.01); *G02B 27/145* (2013.01); *G02B 6/00* (2013.01); *G02B 27/142* (2013.01); *G02B 27/4205* (2013.01); *G02B 2027/0154* (2013.01); *G02B 2027/0158* (2013.01); *G02B 2027/0178* (2013.01)

(58) Field of Classification Search
    CPC .............. G02B 27/0176; G02B 27/142; G02B 27/4205; G02B 2027/0154; G02B 2027/0178; G02C 5/122; G02C 5/124; G02C 7/086; G02C 7/088
    USPC ....... 351/55, 60, 88, 94, 107, 126, 128, 130, 351/131, 132, 136, 137, 140, 141, 148; 349/11, 15, 7–9, 102, 103; 359/630–633
See application file for complete search history.

(56) References Cited

U.S. PATENT DOCUMENTS

| | | | | |
|---|---|---|---|---|
| 5,971,538 A | * | 10/1999 | Heffner | G02C 5/122 345/8 |
| 6,480,174 B1 | * | 11/2002 | Kaufmann | G02B 27/0172 345/7 |
| 2004/0113867 A1 | * | 6/2004 | Tomine | G02B 27/0172 345/8 |
| 2011/0012814 A1 | * | 1/2011 | Tanaka | G02B 27/0176 345/8 |
| 2012/0200935 A1 | * | 8/2012 | Miyao | G02B 27/0172 359/630 |

* cited by examiner

DISPLAY APPARATUS

CROSS REFERENCES TO RELATED APPLICATIONS

This application is a continuation of U.S. patent application Ser. No. 14/026,503, filed Sep. 13, 2013, which is a continuation of U.S. patent application Ser. No. 13/364,103, filed Feb. 1, 2012, now U.S. Pat. No. 8,556,414, which claims priority to Japanese Patent Application No. 2011-027930, filed in the Japan Patent Office on Feb. 10, 2011, the entire contents of which are hereby incorporated by reference.

BACKGROUND

The present disclosure relates to a display apparatus, and more particularly to a display apparatus using a head mounted display (HMD).

JP-A-2006-162767, for example, discloses a virtual image display apparatus (image display apparatus) that allows a viewer to view a two-dimensional image formed by an image formation device in the form of an enlarged virtual image through a virtual image optical system.

As shown in FIG. 7, which is a conceptual diagram, an image display apparatus 100 includes an image formation device 111 in which a plurality of pixels are arranged in a two-dimensional matrix, a collimator optical system 112 that collimates light having exited from the pixels in the image formation apparatus 111, and an optical device (light guide means) 120 on which the collimated light from the collimator optical system 112 is incident, through which the light is guided, and out of which the light exits. The optical device 120 includes a light guide plate 121 through which light incident thereon propagates while undergoing total reflection and out of which the light exits, first deflection means 130 (formed, for example, of a light reflection monolayer film) that reflects the light incident on the light guide plate 121 in such a way that the light incident on the light guide plate 121 undergoes total reflection therein, and second deflection means 140 (formed, for example, of a light reflection multilayer film having a multilayer stacked structure) that outputs the light having propagated through the light guide plate 121 while undergone total reflection out of the light guide plate 121. An HMD or any other display apparatus formed of the thus configured image display apparatus 100 can be lightweight and compact.

JP-A-2007-94175, for example, alternatively discloses a virtual image display apparatus (image display apparatus) using a hologram diffraction grating to allow a viewer to view a two-dimensional image formed by an image formation device in the form of an enlarged virtual image through a virtual image optical system.

As shown in FIG. 11A, which is a conceptual diagram, an image display apparatus 300 basically includes an image formation device 111 that displays an image, a collimator optical system 112, and an optical device (light guide means) 320 on which the image displayed by the image formation apparatus 111 is incident and through which the image is guided to a pupil 21 of a viewer. The optical device 320 includes a light guide plate 321 and first and second diffraction grating members 330, 340, each of which is formed of a reflective volume hologram diffraction grating provided on the light guide plate 321. Light having exited from each pixel in the image formation device 111 is incident on the collimator optical system 112, which produces collimated light, which is then incident on the light guide plate 321. The collimated light is incident on a first surface 322 of the light guide plate 321 and exits therethrough. On the other hand, the first diffraction grating member 330 and the second diffraction grating member 340 are attached to a second surface 323 of the light guide plate 321, which is parallel to the first surface 322 of the light guide plate 321.

When an image of a caption or any other information is displayed in the image display apparatus 100 or 300, a viewer can view the displayed image superimposed on an outside-world image (a player in a play, moving pictures in a movie, for example).

SUMMARY

When the viewer views an image displayed in the image display apparatus 100 or 300, such as a caption, superimposed on an outside-world image, however, the optimum position of the image (virtual image display in the display apparatus 100 or 300) relative to the outside-world image (real image) varies in accordance with the position of the viewer. The technologies disclosed in JP-A-2006-162767 and JP-A-2007-94175, however, are hardly capable of changing the position of the virtual image displayed in the image display apparatus 100 or 300.

It is therefore desirable to provide a display apparatus readily capable of changing the position of a virtual image displayed in an image display apparatus.

A first embodiment of the present disclosure is directed to a display apparatus including:

(1) an eyeglass-type frame worn by a head of a viewer, and (2) an image display apparatus attached to the frame.

The image display apparatus includes (A) an image formation device, and (B) an optical device on which light that exits from the image formation device is incident, through which the light is guided, and out of which the light exits.

The frame is formed of a front portion, two temple portions extending from both ends of the front portion, a nose pad, and an attachment member.

The attachment member is attached to a central section of the front portion.

The optical device is attached to the attachment member.

The nose pad is so attached to the attachment member that the nose pad is movable upward and downward.

In the display apparatus according to the first embodiment of the present disclosure, the optical device may be so attached to the attachment member that the optical device pivotally moves around an axial line parallel to a line connecting centers of eyeballs of the viewer.

A second embodiment of the present disclosure is directed to a display apparatus including:

(1) an eyeglass-type frame worn by a head of a viewer; and (2) an image display apparatus attached to the frame.

The image display apparatus includes (A) an image formation device, and (B) an optical device on which light that exits from the image formation device is incident, through which the light is guided, and out of which the light exits.

The frame is formed of a front portion, two temple portions extending from both ends of the front portion, a nose pad, and an attachment member.

The attachment member is attached to a central section of the front portion.

The nose pad is attached to the attachment member.

The optical device is so attached to the attachment member that the optical device pivotally moves around an axial line parallel to a line connecting centers of eyeballs of the viewer.

A third embodiment of the present disclosure is directed to a display apparatus including:

(1) an eyeglass-type frame worn by a head of a viewer; and (2) an image display apparatus attached to the frame.

The image display apparatus includes (A) an image formation device, and (B) an optical device on which light that exits from the image formation device is incident, through which the light is guided, and out of which the light exits.

The frame is formed of a front portion, two temple portions extending from both ends of the front portion, a nose pad, and an attachment member.

The attachment member includes a box-shaped first member having at least a first side surface, a second side surface extending from one side end of the first side surface, a third side surface extending from the other side end of the first side surface, a fourth side surface connecting the second side surface and the third side surface to each other, and a bottom surface and a second member having at least a first side surface, a second side surface extending from one side end of the first side surface, and a third side surface extending from the other side end of the first side surface.

The first side surface of the first member is attached to a central section of the front portion.

The nose pad is so attached to the fourth side surface of the first member that the nose pad is movable upward and downward.

The optical device is attached to the first side surface of the second member.

With the second side surface of the second member facing the second side surface of the first member, and the third side surface of the second member facing the third side surface of the first member, the second member is so attached to the first member that the second member pivotally moves around an axial line parallel to a line connecting centers of eyeballs of the viewer.

Each of the display apparatus according to the first to third embodiments of the present disclosure includes the attachment member, to which the front portion, the nose pad, and the optical device are attached. Since the nose pad is so attached to the attachment member that the nose pad is movable upward and downward (in accordance with the first or third embodiment of the present disclosure), the relative positional relationship (relationship in up-down direction) between the viewer and the optical device can be readily changed. Alternatively, since the optical device is so attached to the attachment member that the optical device pivotally moves around an axial line parallel to the line connecting the centers of the eyeballs of the viewer (in accordance with the second or third embodiment of the present disclosure), the relative positional relationship (relationship in angular direction) between the viewer and the optical device can be readily changed. As a result, the position of a virtual image displayed in the image display apparatus can be readily changed, whereby, for example, the viewer can view an outside-world image superimposed with an image, such as a caption, displayed in the image display apparatus with the position of the image (virtual image displayed in image display apparatus) readily optimized relative to the outside-world image (real image).

Additional features and advantages are described herein, and will be apparent from the following Detailed Description and the figures.

DETAILED DESCRIPTION

Figure 1A:
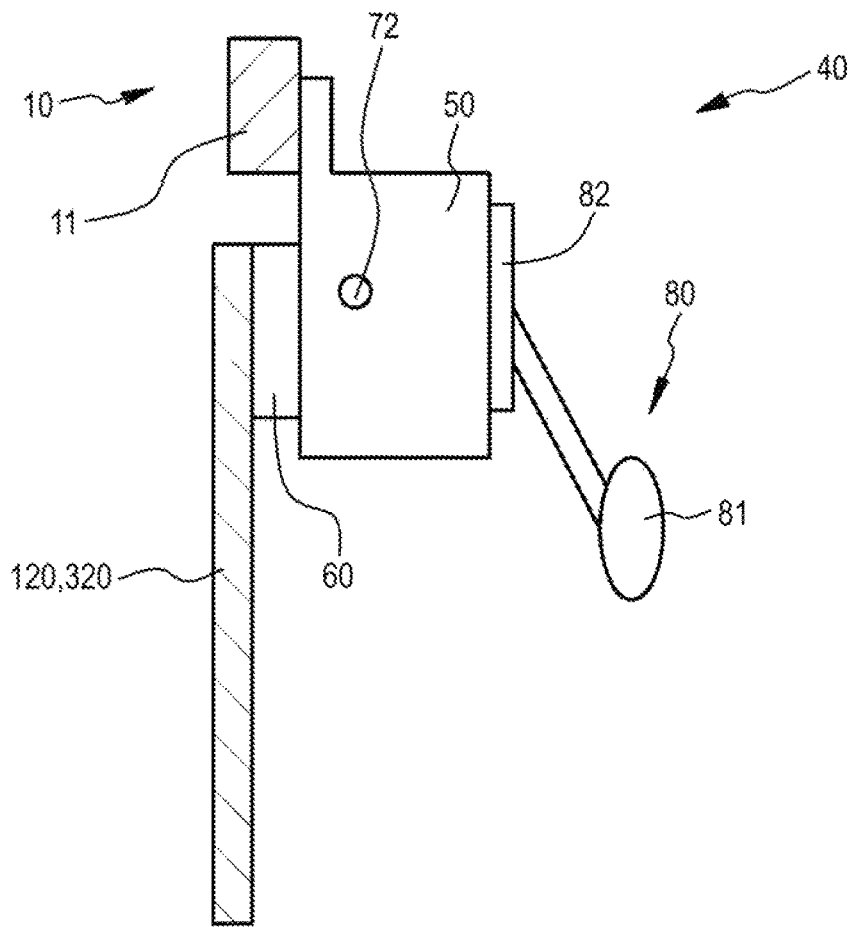
FIG. 1A is a side view of an attachment member and a nose pad of a display apparatus according to Example 1 with a front portion and an optical device thereof cut out.

The present disclosure will be described below based on Examples with reference to the drawings. It is, however, noted that the present disclosure is not limited to Examples, and a variety of values and materials shown in Examples are presented by way of examples. The description will be made in the following orders:

1. Overall description of display apparatus according to first to third embodiments of the present disclosure
2. Example 1 (display apparatus according to first to third embodiments of the present disclosure)
3. Example 2 (variation of Example 1)
4. Example 3 (another variation of Example 1)
5. Example 4 (another variation of Example 1)
6. Example 5 (another variation of Example 1) and others

[Overall Description of Display Apparatus According to First to Third Embodiments of the Present Disclosure]

A display apparatus according to a third embodiment of the present disclosure is so configured, but not necessarily, that through holes are formed through second and third side surfaces of a first member and second and third side surfaces of a second member, a first connecting member is inserted into the through hole formed through the second side surface of the first member and the through hole formed through the second side surface of the second member, a second connecting member is inserted into the through hole formed through the third side surface of the first member and the through hole formed through the third side surface of the second member, and the first and second connecting members are disposed along an axial line parallel to a line connecting the centers of the eyeballs of a viewer.

In the display apparatus according to the third embodiment of the present disclosure having the preferred configuration described above, a groove extending in the up-down direction is formed in a fourth side surface of the first member, a nose pad is formed of pad portions and a pad attachment portion, and the pad attachment portion is movable upward and downward along the groove.

Further, in the display apparatus according to the third embodiment of the present disclosure having the preferred configuration described above, a latch member that engages with the pad attachment portion can be attached to the bottom surface of the first member. Moreover, in the display apparatus according to the third embodiment of the present disclosure having the preferred configuration described above, locking portions that engage with the bottom of the second side surface and the bottom of the third side surface of the second member can be provided on the bottom surface of the first member.

In any of the display apparatus according to the first to third embodiments of the present disclosure having the preferred form and configuration described above, an optical device can be of semitransparent (see-through) type. Specifically, it is desirable that the portion of the optical device that faces one of the eyes of the viewer is semitransparent (see-through), and that the viewer can look at an outside view through the semitransparent (see-through) portion of the optical device.

In the display apparatus according to the third embodiment of the present disclosure, each of the first and second connecting members may, for example, be formed of a metal pin or a metal round bar. The first and second connecting members may be separate members or may be integrated with each other (a single metal pin or round bar, for example). The first and second connecting members may be so locked appropriately that they do not come out of the first and second members.

Each of the display apparatus according to the first to third embodiments of the present disclosure having the preferred form described above (hereinafter sometimes simply referred collectively to as "display apparatus according to the embodiments of the present disclosure") may include one or two image display apparatus.

In each of the image display apparatus, which form the display apparatus according to the embodiments of the present disclosure having a variety of preferred forms and configurations described above (hereinafter simply referred to as "image display apparatus according to the embodiments of the present disclosure"), the optical device may include:

(a) a light guide plate through which light incident thereon propagates while undergoing total reflection and out of which the light exits;

(b) a first deflection unit that deflects the light incident on the light guide plate in such a way that the light incident on the light guide plate undergoes total reflection therein; and (c) a second deflection unit that deflects several times the light having propagated through the light guide plate while undergone total reflection therein to output the light having propagated through the light guide plate while undergone total reflection therein out of the light guide plate.

The term "total reflection" means internal total reflection or total reflection in the light guide plate. This holds true in the following description.

Light rays that exit from the center of the image formation device and pass through the nodal point of the optical system on the image formation device side are called "central light rays," and among them, a light ray incident on the optical device at right angles is called a "central incident light ray." Let an optical device central point be a point on the optical device on which the central incident light ray is incident, an X axis be an axial line that passes through the optical device central point and is parallel to the axial line of the optical device, and a Y axis be an axial line that passes through the optical device central point and coincides with a normal to the optical device. A horizontal direction in the display apparatus according to any of the embodiments of the present disclosure is a direction parallel to the X axis and hereinafter sometimes referred to as an "X-axis direction." The optical system is disposed between the image formation device and the optical device and collimates light having exited from the image formation device. A light flux collimated by the optical system is incident on the optical device, guided therethrough, and exit out thereof. The "optical device central point" is the central point of the first deflection unit.

In the image display apparatus according to any of the embodiments of the present disclosure, the central light rays can be, but not necessarily, configured to intersect the XY plane at an angle (θ) other than zero degrees when the optical device is located in a reference attachment position, whereby the apparatus can be designed with a high degree of freedom because the image display apparatus can be attached to an attachment portion of an eyeglass-shaped frame with few limitation on the angle at which the image display apparatus is attached. When the XY plane coincides with a horizontal plane, the angle θ at which the central light rays intersect the XY plane can be an angle of elevation. That is, the central light rays can be directed upward toward the XY plane and impinge thereon. In this case, the XY plane preferably intersects a vertical plane at an angle other than zero degrees. Further, the XY plane preferably intersects the vertical plane at an angle θ'. The maximum value of θ' can be, but is not limited to, 5 degrees. The horizontal plane used herein is a plane not only including a line of sight of a viewer who looks at an object positioned in the horizontal direction (an object at infinity, the horizon, for example) ("a horizontal line of sight of the viewer") but also including two horizontally positioned pupils of the viewer. The vertical plane used herein is a plane perpendicular to the horizontal plane. Alternatively, when the viewer looks at an object positioned in the horizontal direction (an object at infinity, the horizon, for example), the central light rays that exit from the optical device and enter the pupil of the viewer can form an angle of depression. An angle of depression with respect to the horizontal plane can, for example, range from 5 to 45 degrees. The situation in which "the optical device is located in a reference attachment position" is defined as follows: That is, when the optical device is pivoted upward to an upper limit around the axial line parallel to the line connecting the centers of the eyeballs of the viewer, let $\theta_{UP}$ be an angle between the optical device and a first side surface of the first member, and when the optical device is pivoted downward to a lower limit around the axial line, let $\theta_{DOWN}$ be an angle between the optical device and the first side surface of the first member. The situation in which "the optical device is located in a reference attachment position" occurs when the optical device is so positioned that the angle between the optical device and the first side surface of the first member is $(\theta_{UP}+\theta_{DOWN})/2$.

The first deflection unit can be configured to reflect the light incident on the light guide plate, and the second deflection unit can be configured to transmit and reflect several times the light having propagated through the light guide plate while undergone total reflection therein. In this case, the first deflection unit can function as a reflection mirror, and the second deflection unit can function as a half-silvered mirror.

In the configuration described above, the first deflection unit can be formed of a light reflection film (a kind of mirror) that is made, for example, of a metal containing an alloy and reflects the light incident on the light guide plate or a diffraction grating (hologram diffraction grating film, for example) that diffracts the light incident on the light guide plate. The second deflection unit can be formed of a multilayer stacked structure in which a large number of dielectric films are stacked, half-silvered mirrors, polarizing beam splitters, or a hologram diffraction grating film. The first and second deflection units are disposed in the light guide plate (incorporated in the light guide plate), and the first deflection unit reflects or diffracts the collimated light incident on the light guide plate in such a way that the collimated light incident on the light guide plate undergoes total reflection therein. On the other hand, the second deflection unit reflects or diffracts several times the collimated light having propagated through the light guide plate while undergone total reflection therein and outputs the light from the light guide plate in the form of collimated light.

Alternatively, the first deflection unit can be configured to diffract the light incident on the light guide plate, and the second deflection unit can be configured to diffract several times the light having propagated through the light guide plate while undergone total reflection therein. In this case, each of the first and second deflection unit can be formed of a diffraction grating element, which is formed of a reflective or transmissive diffraction grating element. Alternatively, one of the diffraction grating elements can be a reflective diffraction grating element, and the other diffraction grating element can be a transmissive diffraction grating element. The reflective diffraction grating element can be a reflective volume hologram diffraction grating. A first deflection unit formed of a reflective volume hologram diffraction grating is called a "first diffraction grating member" in some cases for convenience, and a second deflection unit formed of a reflective volume hologram diffraction grating is called a "second diffraction grating member" in some cases for convenience.

The image display apparatus according to any of the embodiments of the present disclosure can display an image of a single color (green, for example). To display a color image, the first or second diffraction grating member can be formed by stacking P diffraction grating layers, each of which is formed of a reflective volume hologram diffraction grating, to diffractively reflect P types (P=3, for example, 3 types including red, green, and blue) of light corresponding to different P types of wavelength band (or wavelength). In the diffraction grating layers, interference fringes corresponding to the respective types of wavelength band (or wavelength) are formed. Alternatively, P types of interference fringes can be formed in the first or second diffraction grating member formed of a diffraction grating monolayer to diffractively reflect P types of light corresponding to different P types of wavelength band (or wavelength). Still alternatively, in a configuration in which the viewing angle of the display apparatus is divided into three, the first or second diffraction grating member can be formed by stacking diffraction grating layers corresponding to each of the divided viewing angles. When the first or second diffraction grating member employing any of the configurations described above diffractively reflects light having any of the wavelength bands (or wavelengths), the diffraction efficiency and the diffraction reception angle can be increased, and the angle of diffraction can be optimized.

The first and second diffraction grating members can be made of a photopolymer material. The material and the basic structure of each of the first and second diffraction grating members, each of which is formed of a reflective volume hologram diffraction grating, may be the same as the material and the structure of a reflective volume hologram diffraction grating of related art. The reflective volume hologram diffraction grating used herein means a hologram diffraction grating that diffractively reflects only positive first-order diffracted light. Interference fringes formed in each of the diffraction grating members and extending across the thickness thereof may be formed in the same manner as in related art. Specifically, for example, interference fringes may be formed by irradiating a member (made of photopolymer material, for example) that forms each of the diffraction grating members with object light from one side in a first predetermined direction and simultaneously irradiating the member that forms the diffraction grating member with reference light from the other side in a second predetermined direction, and the interference fringes thus formed by the object light and the reference light may be recorded in the member that forms the diffraction grating member. When the first predetermined direction, the second predetermined direction, and the wavelengths of the object light and the reference light are selected appropriately, the interference fringes formed on the surface of the diffraction grating member can have a desired interval and a desired inclination angle (slant angle). The inclination angle of interference fringes means an angle between the surface of the diffraction grating member (or diffraction grating layer) and the interference fringes. When each of the first and second diffraction grating members has a stacked structure in which P diffraction grating layers each of which is formed of a reflective volume hologram diffraction grating are formed, the diffraction grating layers may be stacked by first separately producing the P diffraction grating layers and then stacking (gluing) the P diffraction grating layers, for example, with an ultraviolet curing adhesive. The P diffraction grating layers may alternatively stacked by first producing a single diffraction grating layer made of an adhesive photopolymer material and then successively bonding the adhesive photopolymer material to form other diffraction grating layers.

Alternatively, in the image display apparatus according to any of the embodiments of the present disclosure, the optical device can be formed of a half-silvered mirror on which the light having exited from the image formation device is incident and out of which the light exits toward the pupil of the viewer. The light having exited from the image formation device may propagate in the air and be incident on the half-silvered mirror or may propagate through a glass plate, a plastic plate, or any other transparent member (specifically, a member made of the same material as that of the light guide plate, which will be described later) and be incident on the half-silvered mirror. The half-silvered mirror may be attached to the image formation device via the transparent member or may be attached to the image formation device via a member different from the transparent member.

In the image display apparatus according to any of the embodiments of the present disclosure having the variety of preferred forms and configurations described above, the image formation device can be configured to have a plurality of pixels arranged in a two-dimensional matrix. The configuration of the image formation device described above is called a "first-configuration image formation device" for convenience.

The first-configuration image formation device can, for example, be an image formation device formed of a reflective spatial light modulator and a light source; an image formation device formed of a transmissive spatial light modulator and a light source; or an image formation device formed of an organic EL (electro luminescence) or an inorganic EL and a light emitting diode (LED) or any other suitable light emitting device. Among them, an image formation device formed of a reflective spatial light modulator and a light source is preferred. Examples of the spatial light modulator may include a light valve, for example, a LCOS (liquid crystal on silicon) device and any other transmissive or reflective liquid crystal display device, and a digital micromirror device (DMD), and an example of the light source may include a light emitting device. Further, a reflective spatial light modulator can be formed of a liquid crystal display device and a polarizing beam splitter that reflects part of the light from the light source, guides the reflected light to the liquid crystal display device, transmits part of the light reflected off the liquid crystal display device, and guides the reflected light to the following optical system. An example of the light emitting device that forms the light source can be a red light emitting device, a green light emitting device, a blue light emitting device, or a white light emitting device. Alternatively, red light, green light, and blue light emitted from a red light emitting device, a green light emitting device, and a blue light emitting device may be combined and homogenized in terms of luminance by using a light pipe to form white light. The light emitting device can alternatively be a semiconductor laser, a solid-state laser, or an LED by way of example. The number of pixels may be determined based on the specifications typically required for the image display apparatus, and a specific example of the number of pixels can be 320×240, 432×240, 640×480, 1024×768, and 1920×1080.

Alternatively, in the image display apparatus according to any of the embodiments of the present disclosure having the variety of preferred forms and configurations described above, the image formation device can be configured to include a light source and a scan unit that causes collimated light emitted from the light source to scan a target. The configuration of the image formation device described above is called a "second-configuration image formation device" for convenience.

An example of the light source in the second-configuration image formation device may include a light emitting device, specifically, a red light emitting device, a green light emitting device, a blue light emitting device, or a white light emitting device. Alternatively, red light, green light, and blue light emitted from a red light emitting device, a green light emitting device, and a blue light emitting device may be combined and homogenized in terms of luminance by using a light pipe to form white light. The light emitting device can alternatively be a semiconductor laser, a solid-state laser, and an LED by way of example. The number of pixels (virtual pixels) in the second-configuration image formation device may also be determined based on the specifications typically required for the image display apparatus, and a specific example of the number of pixels (virtual pixels) can be 320×240, 432×240, 640×480, 1024×768, and 1920×1080. To display a color image by using a light source formed of a red light emitting device, a green light emitting device, and a blue light emitting device, a cross prism or any other similar element is preferably used to perform color combination. An example of the scan unit may include a device that causes the light emitted from the light source to scan a target horizontally and vertically, such as a MEMS (micro electro mechanical system) having a micromirror rotatable in two-dimensional directions or a galvanometer mirror.

In the first-configuration or second-configuration image formation device, the optical system (optical system through which light exits in the form of collimated light and is sometimes called a "collimated light outputting optical system", specifically, a collimator optical system, a relay optical system, or any other similar optical system) causes a plurality of collimated light fluxes to be incident on the light guide plate. The reason why the light fluxes need to be collimated is that information on the wavefronts of the light fluxes incident on the light guide plate needs to be preserved after the light fluxes exit from the light guide plate via the first and second deflection units. Specifically, to produce a plurality of collimated light fluxes, for example, the portion of the image formation device from which light exits may be located at a point (position) corresponding to the focal length of the collimated light outputting optical system. The collimated light outputting optical system has a function of converting information on the position of a pixel into angular information in the optical system in the optical device. The collimated light outputting optical system can, for example, be an optical system formed of a convex lens, a concave lens, a free-form surface prism, a hologram lens or a combination thereof and having positive optical power as a whole. A light shielding member having an aperture may be disposed between the collimated light outputting optical system and the light guide plate in order to prevent any undesired light from the collimated light outputting optical system from entering the light guide plate.

The light guide plate has two surfaces (first and second surfaces) parallel to each other and extending parallel to the axial line of the light guide plate (X axis). Now, let a light guide plate light-incident surface be the surface of the light guide plate on which light is incident, and let a light guide plate light-exiting surface be the surface of the light guide plate through which light exits. The first surface may serve as both the light guide plate light-incident surface and the light guide plate light-exiting surface, or the first surface may serve as the light guide plate light-incident surface and the second surface may serve as the light guide plate light-exiting surface. The light guide plate may be made of glass including quartz glass, BK7, or any other optical glass, or a plastic material (for example, PMMA, polycarbonate resin, acrylic resin, amorphous polypropylene-based resin, and styrene-based resin including AS resin). The light guide plate does not necessarily have a flat-plate shape but may have a curved shape.

In the display apparatus according to any of the embodiments of the present disclosure, the frame can be configured to include a front portion disposed in front of a viewer and two temple portions pivotally attached to both ends of the front portion via hinges, as described above. An end cover is attached to the tip of each of the temple portions. The configuration in which the image display apparatus is attached to the frame may be specifically achieved, for example, by attaching the image formation device to each of the temple portions. Alternatively, the front portion may be integrated with the two temple portions. That is, when one looks at the entire display apparatus according to any of the embodiments of the present disclosure, the frame has a structure substantially the same as that of a typical pair of eyeglasses. The frame including pad portions can be made of a metal, an alloy, a plastic, or a combination thereof, which is the same as the material of a typical pair of eyeglasses.

An attachment member and a pad attachment portion of the frame may be made, for example, of a plastic material. The attachment member (or first side surface of first member) may be attached to a central section of the front portion, for example, with screws. Further, the optical device may be attached to the attachment member (or first side surface of second member), for example, with screws. In some cases, a cutout may be provided in the attachment member (or first side surface of second member), and the optical device may be fit into the cutout. Alternatively, the optical device may be bonded to the attachment member (or first side surface of second member) with a double-sided adhesive sheet. The latch member formed, for example, of a plate spring is fixed to the bottom surface of the first member with screws. The nose pad can be positioned with respect to the attachment member by providing a protrusion (latch receiver) at a single location on the surface of the pad attachment portion that faces the first side surface of the first member, providing a plurality of recesses in the latch member, and fitting the protrusion on the pad attachment portion in one of the recesses in the latch portion, and the nose pad can be so attached to the attachment member that the nose pad is movable upward and downward relative to the attachment member. Alternatively, the nose pad can be positioned with respect to the attachment member by providing a recess (latch receiver) at a single location in the surface of the pad attachment portion that faces the first side surface of the first member, providing a plurality of protrusions on the latch member, and fitting one of the protrusions on the latch portion in the recess in the pad attachment portion, and the nose pad can be so attached to the attachment member that the nose pad is movable upward and downward relative to the attachment member. Each of the locking portions also formed, for example, of a plate spring is fixed to the bottom surface of the first member with screws. Alternatively, each of the locking portions can be a protrusion provided on the bottom surface of the first member and integrated with the bottom surface. Cutouts (lock receivers) are provided on each of the bottom of the second side surface and the bottom of the third side surface of the second member, which engage with the locking portions, whereby the optical device can be positioned with respect to the attachment member, and the optical device can be pivotally attached to the attachment member.

An imaging device can be attached to the central section of the front portion. The imaging device is specifically formed of a CCD sensor, a CMOS sensor, or any other solid-state imaging device and a lens. The imaging device may be wired, for example, to one of the image display apparatus (or image formation device) via the front portion or may be bundled with a wiring line extending from the image display apparatus (or image formation device).

In the display apparatus according to any of the embodiments of the present disclosure, the wiring lines from the two image formation devices (such as signal lines and power source lines) desirably extend along the temple portions, pass through the end covers, further extend outward from the tips thereof, and are connected to a control unit (control means, control circuit) from the viewpoint of exterior appearance of the display apparatus design or how readily the display apparatus can be worn. Further, each of the image formation devices can include a headphone unit, and wiring lines for the headphone unit can extend from the image formation device along the corresponding temple portion, pass through the corresponding end cover, and further extend outward from the tip of the end cover to the headphone unit. Examples of the headphone unit may include an inner-ear headphone unit and a cannel-type headphone unit. More specifically, the wiring lines for the headphone unit preferably further extend from the tip of the end cover to the headphone unit in such a way that the wiring lines follow the backside of the auricle (ear capsule).

The display apparatus according to any of the embodiments of the present disclosure can be used, for example, to display the following information: captions in a movie or any other visual medium; descriptions and closed captions related to moving pictures and synchronized therewith; and a variety of descriptions of an object being viewed, descriptions of the contents, the progress, and the backgrounds thereof, and other information, for example, in a play, a Kabuki play, a No play, a Kyogen play, an opera, a concert, a ballet, a variety of dramatic performances, an amusement park, an art museum, a sightseeing place, a holiday resort, and a sightseeing guide. The display apparatus according to any of the embodiments of the present disclosure also functions as a character display apparatus and can be used to display the following information: a variety of descriptions, symbols, characters, marks, emblems, and patterns necessary when one runs, operates, maintains, disassembles, and otherwise manipulates an object being viewed, such as a variety of apparatus; a variety of descriptions, symbols, characters, marks, emblems, and patterns of a person, an article, or any other object being viewed; and closed captions. In a play, a Kabuki play, a No play, a Kyogen play, an opera, a concert, a ballet, a variety of dramatic performances, an amusement park, an art museum, a sightseeing place, a holiday resort, a sightseeing guide, and other similar things that need displayed information, the display apparatus may display an image containing characters associated with an object being viewed at appropriate timing. Specifically, for example, an image signal is sent to the display apparatus in response to operator's operation or under the control of a computer or any other controller based on a predetermined schedule or time allocation in accordance with the progress of a movie, a play or any other performance, and the display apparatus displays an image. Further, to display a variety of descriptions of an object being viewed, such as a variety of apparatus, a person, or an article, the imaging device disposed in the display apparatus captures images of the object being viewed, such as a variety of apparatus, a person, or an article and the display apparatus analyzes the captured images, whereby the display apparatus can display a variety of pre-created descriptions of the object being viewed, such as a variety of apparatus, a person, or an article. Alternatively, the display apparatus according to any of the embodiments of the present disclosure can also be used as a stereoscopic display apparatus. In this case, a polarizer or a polarizing film may be removably attached or bonded to the optical device as necessary.

In the display apparatus according to any of the embodiments of the present disclosure, an image to be displayed by the optical device based on an image signal is formed, for example, of characters. The image signal carrying an image containing characters to be displayed (sometimes called "character data") may be formed of digitized data and created by an operator or in a process performed by a computer or any other suitable apparatus. The format of the character data may be selected as appropriate in accordance with a display apparatus or a system to be used and may be text data formed of character strings or image data containing character strings in the form of image.

The image signal can be wirelessly sent to the display apparatus. In this case, the control unit, for example, receives the image signal, which is then so processed by the control unit that an image carried by the image signal is displayed. The image signal can alternatively be stored in the display apparatus (control unit) in advance. The control unit (control means, control circuit) may be formed of a known circuit.

The display apparatus according to any of the embodiments of the present disclosure can externally receive, in addition to the image signal to the image formation device, a luminance signal associated with an image to be displayed in the optical device, or the display apparatus can further include a photodetector and control the luminance of an image to be displayed in the optical device based on environment luminance information obtained by the photodetector (the environment refers to an atmosphere in which the display apparatus is used or an object to be viewed is placed). In the former form, a luminance signal may be externally and wirelessly sent to the display apparatus. In the latter form, the photodetector can specifically be a photodiode or an exposure measurement photodetector disposed in the camera or the imaging device described above.

The image signal to the image formation device can contain not only image data (character data, for example) but also, for example, data on the luminance of an image to be displayed (luminance information), chromaticity data (chromaticity information), or both the luminance data and the chromaticity data, as described above. The luminance data can be so produced that it corresponds to the luminance of a predetermined area including an object being viewed through the optical device, and the chromaticity data can be so produced that it corresponds to the chromaticity of the predetermined area including the object being viewed through the optical device. The luminance (brightness) of an image to be displayed can be thus controlled by providing data on the luminance of the image, and the chromaticity (color) of an image to be displayed can be controlled by providing data on the chromaticity of the image. Further, both the luminance (brightness) and the chromaticity (color) of an image to be displayed can be controlled by providing data on the luminance and the chromaticity of the image. When the luminance data is so produced that it corresponds to the luminance of a predetermined area including an object being viewed through the image display apparatus, the values of the luminance data may be so set that the luminance values of an image increase (that is, the image is displayed brighter) as the luminance values of the predetermined area including the object being viewed through the image display apparatus. Further, when the chromaticity data is so produced that it corresponds to the chromaticity of the predetermined area including the object being viewed through the image display apparatus, the values of the chromaticity data may be so set that the chromaticity of the predetermined area including the object being viewed through the image display apparatus is substantially complementary to the chromaticity of an image to be displayed. Complementary colors refer to a set of colors that lie opposite each other on the color circle. Examples of complementary colors include red versus green, yellow versus violet, and blue versus orange. Complementary colors also cause a decrease in chroma when a certain color is mixed with the other color in an appropriate proportion. For example, white is produced in the case of light, and black is produced in the case of an object. It is, however, noted that complementarity in a visual effect produced when complementary colors are placed side by side differs from complementarity in a visual effect produced when the complementary colors are mixed with each other. Complementary colors are also called contrast colors or opposite colors. It is, however, noted that opposite colors directly refer to colors complementary to each other, whereas complementary colors refer to slightly broader ranges of color. A color combination of complementary colors produces a synergy effect in which one of the two colors enhances the other and vice versa, which is called complementary color harmony.

In the display apparatus according to any of the embodiments of the present disclosure, to reduce fatigue of the pupils of a viewer produced when the viewer keeps looking at an image (caption or virtual image, for example) displayed in a fixed position, the positions of images (image positions) formed by the two optical devices or the distances from the two optical devices to images (captions or virtual images, for example) (image distances) formed by the two optical devices can be changed with time. "Change with time" means, for example, that the horizontal position of an image is changed once in every 5 to 10 minutes or any suitable period by two pixels in the positive direction or one pixel in the negative direction in the image formation device, for example, for a period ranging from 1 to 3 minutes or any suitable period, and then the changed position is put back to the original position.

EXAMPLE 1

Figure 1B:
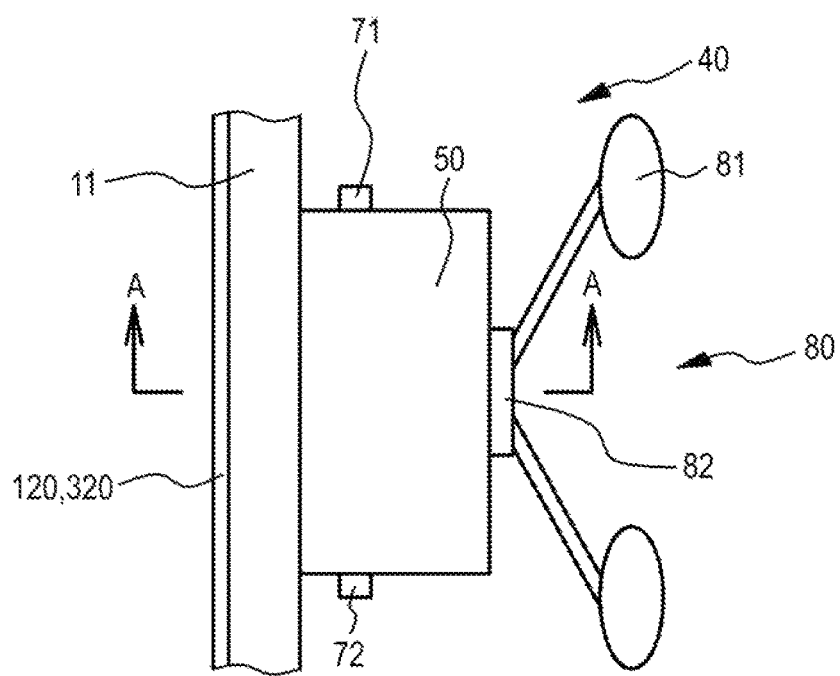
FIG. 1B is a top view of the front portion, the optical device, the attachment member, and the nose pad.
Figure 2A:
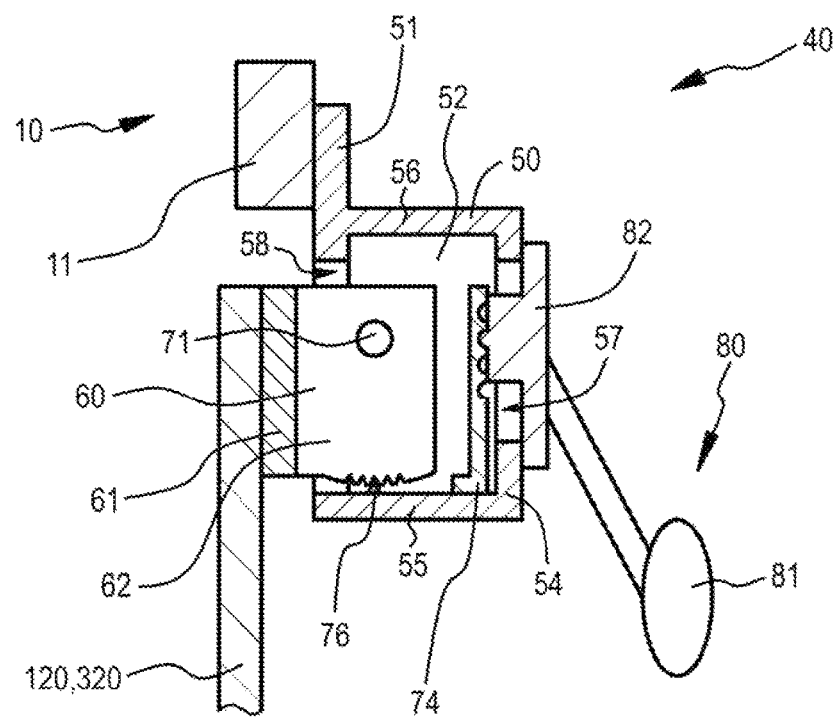
FIG. 2A is a diagrammatic cross-sectional view of the front portion, the optical device, the attachment member, and the nose pad taken along the arrow A-A in FIG. 1B.
Figure 2B:
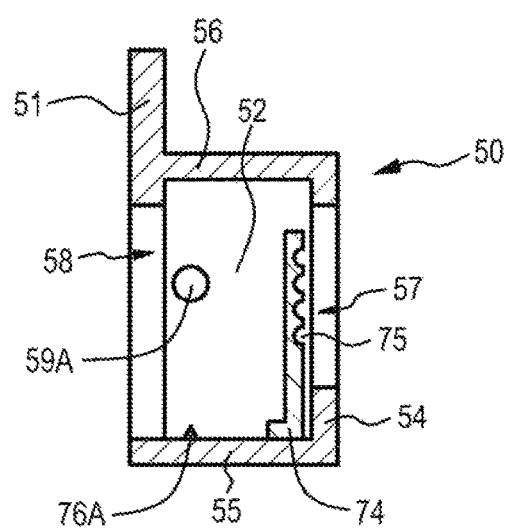
FIG. 2B is a diagrammatic cross-sectional view of a first member viewed from the side where a third side surface thereof is present.
Figure 2C:
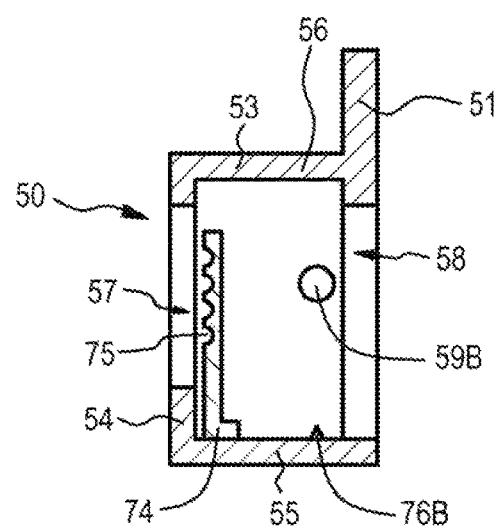
FIG. 2C is a diagrammatic cross-sectional view of the first member viewed from the side where a second side surface thereof is present.
Figure 3A:
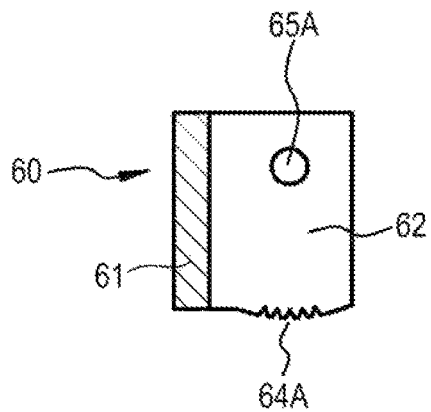
FIG. 3A is a diagrammatic cross-sectional view of a second member viewed from the side where a third side surface thereof is present.
Figure 3B:
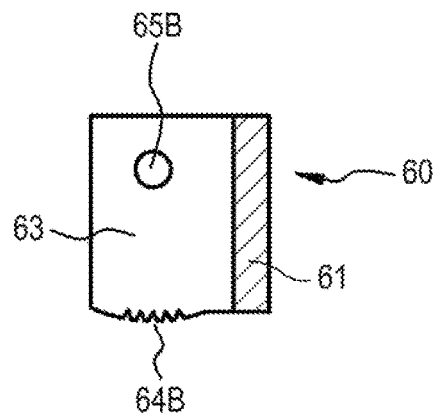
FIG. 3B is a diagrammatic cross-sectional view of the second member viewed from the side where a second side surface thereof is present.
Figure 3C:
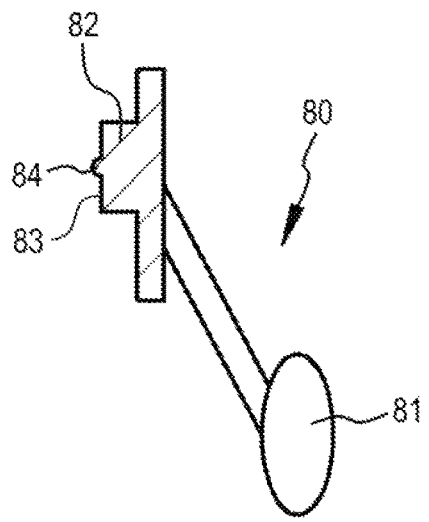
FIG. 3C is a diagrammatic cross-sectional view of the nose pad.
Figure 4:
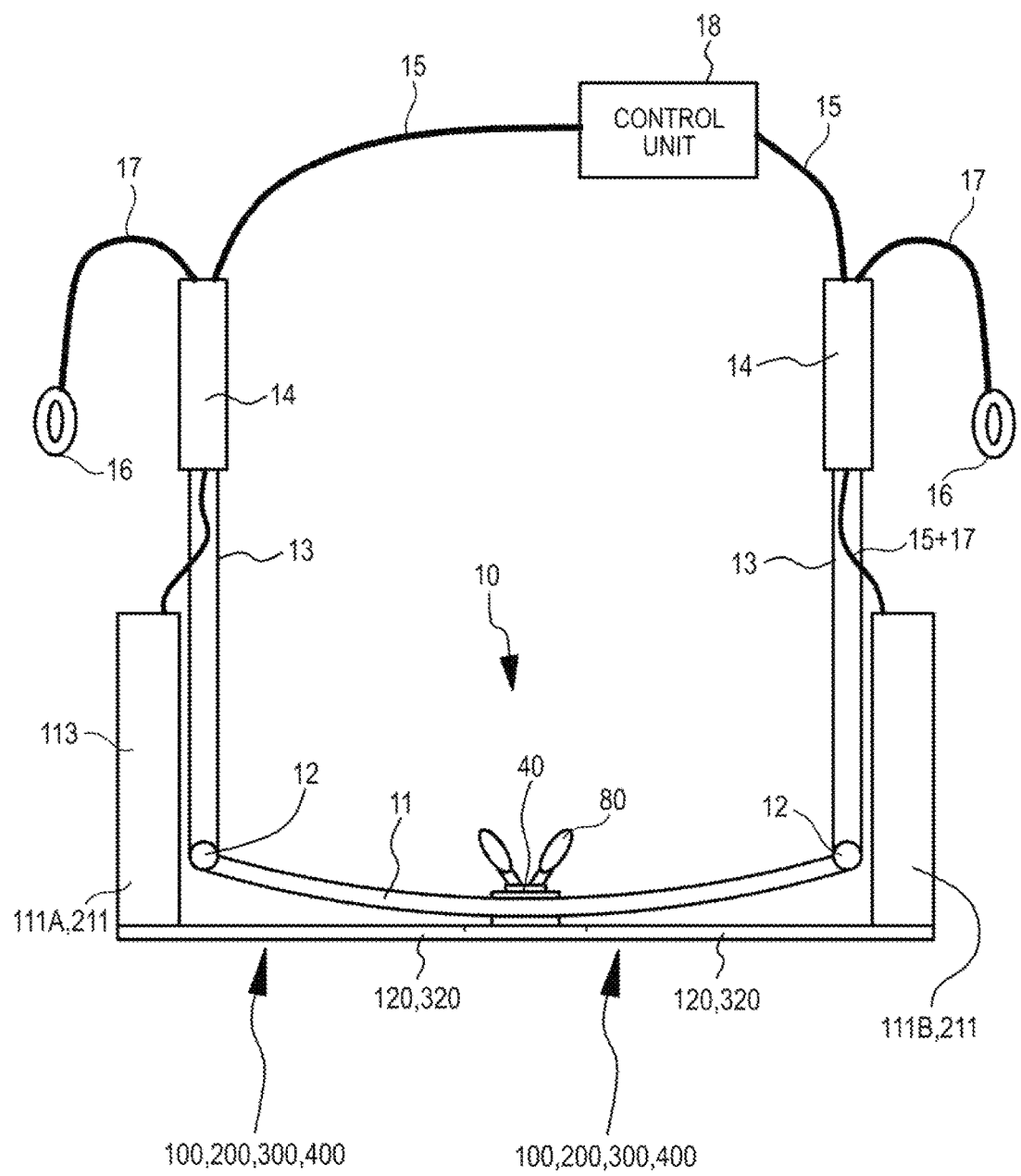
FIG. 4 is a diagrammatic top view of the display apparatus according to Example 1.
Figure 5:
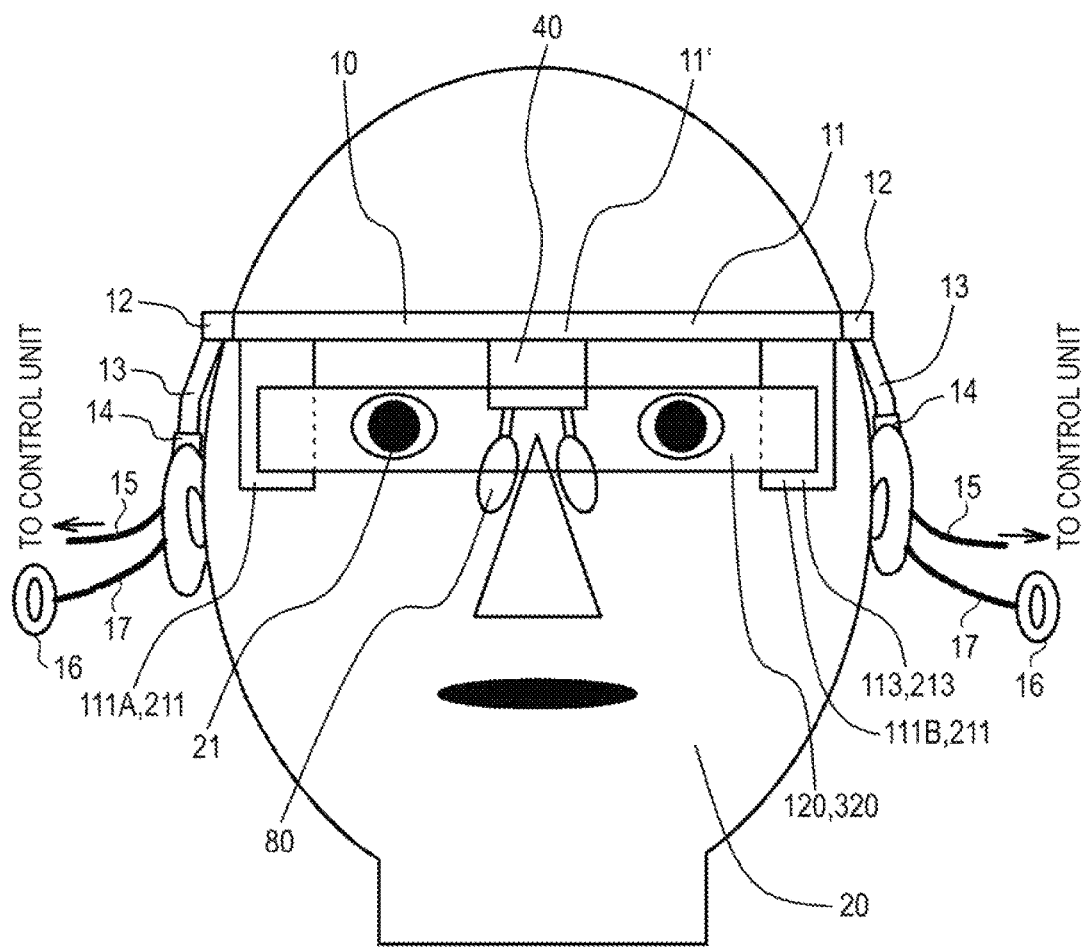
FIG. 5 is a diagrammatic front view of the display apparatus according to Example 1.
Figure 6:
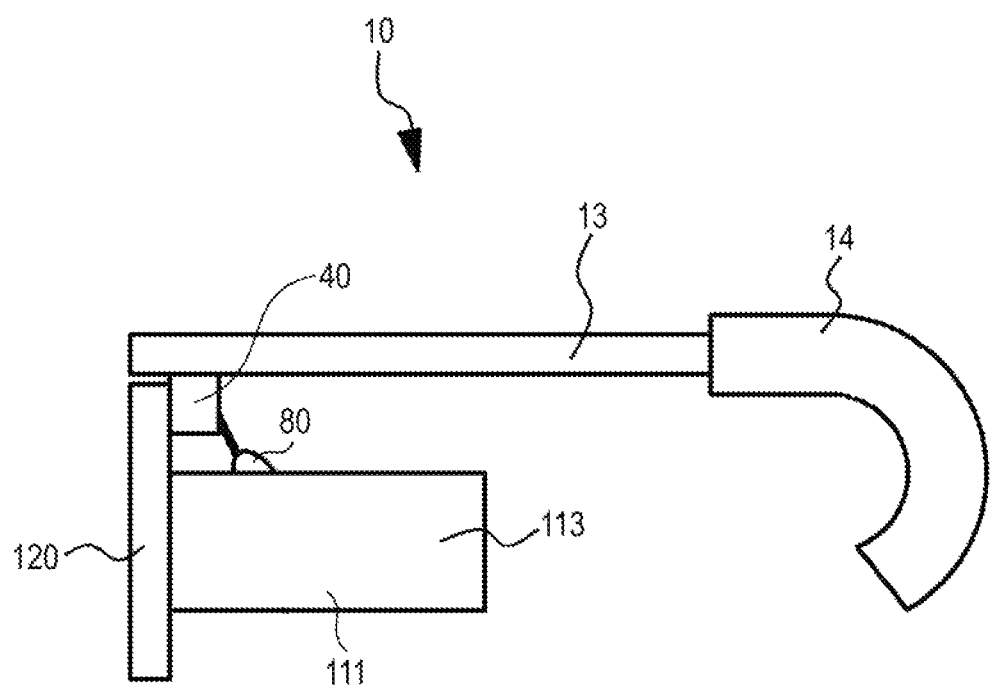
FIG. 6 is a diagrammatic side view of the display apparatus according to Example 1.
Figure 7:
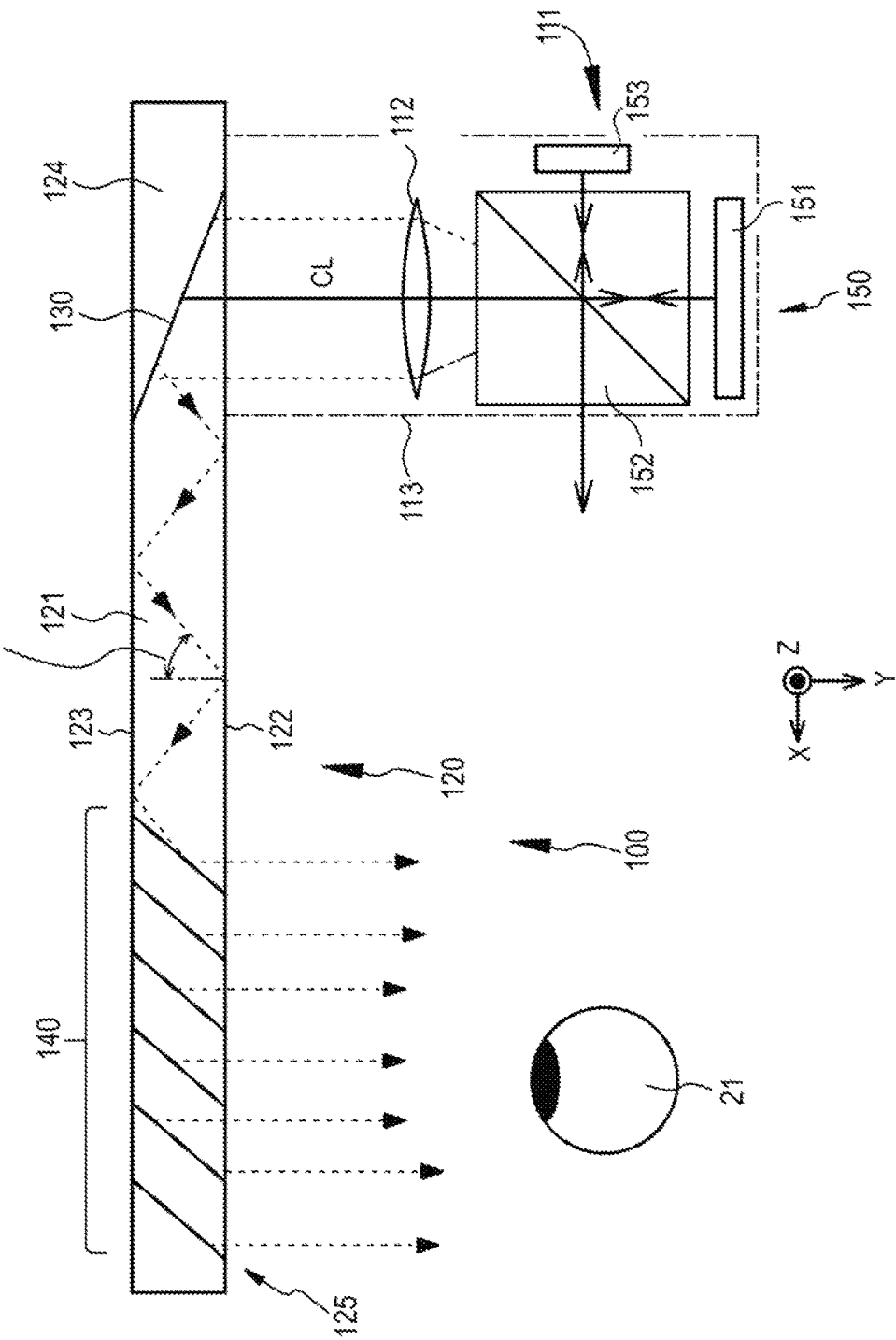
FIG. 7 is a conceptual diagram of an image display apparatus in the display apparatus according to Example 1.
Figure 8:
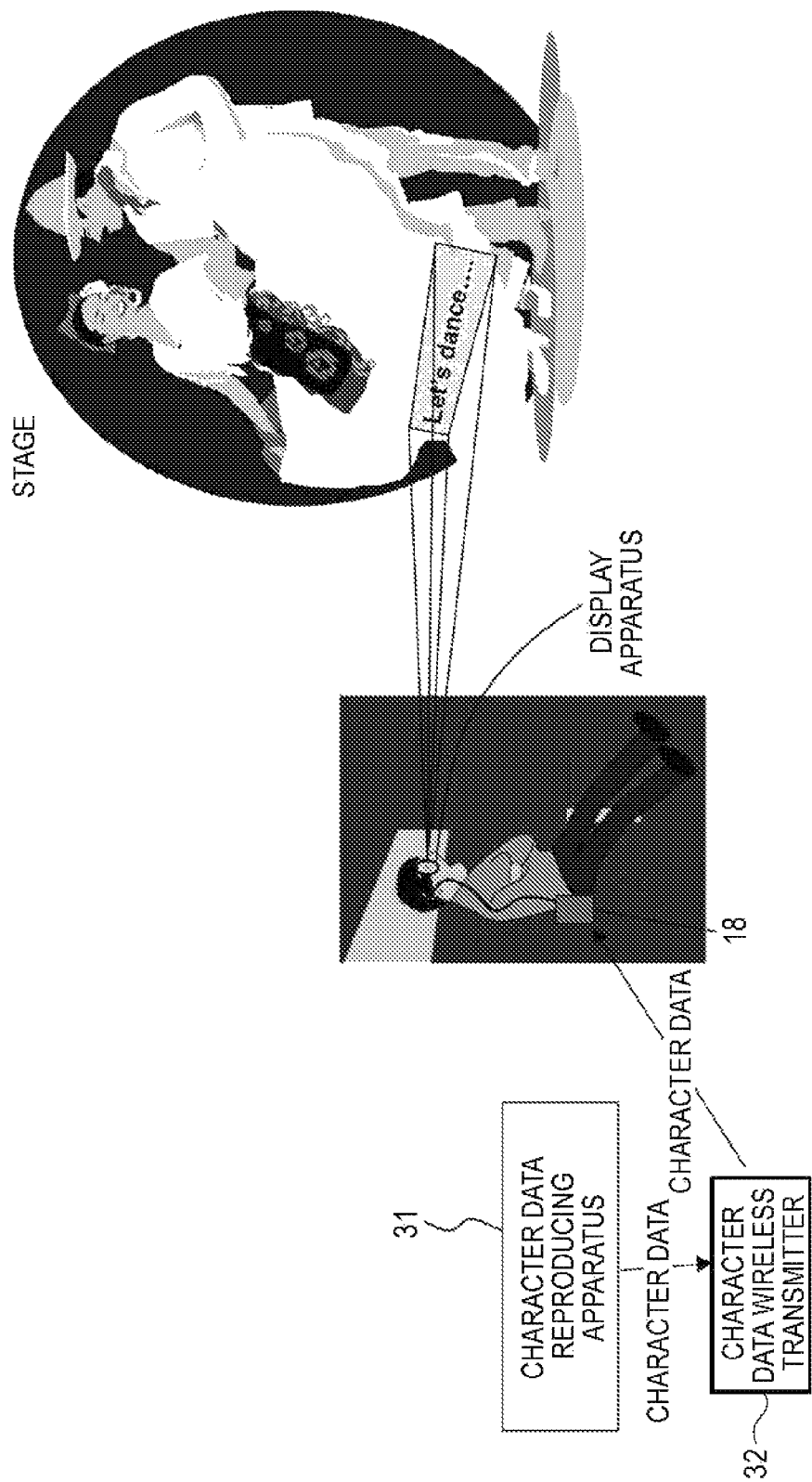
FIG. 8 is a conceptual diagram showing how to use the display apparatus according to Example 1.
Figure 9:
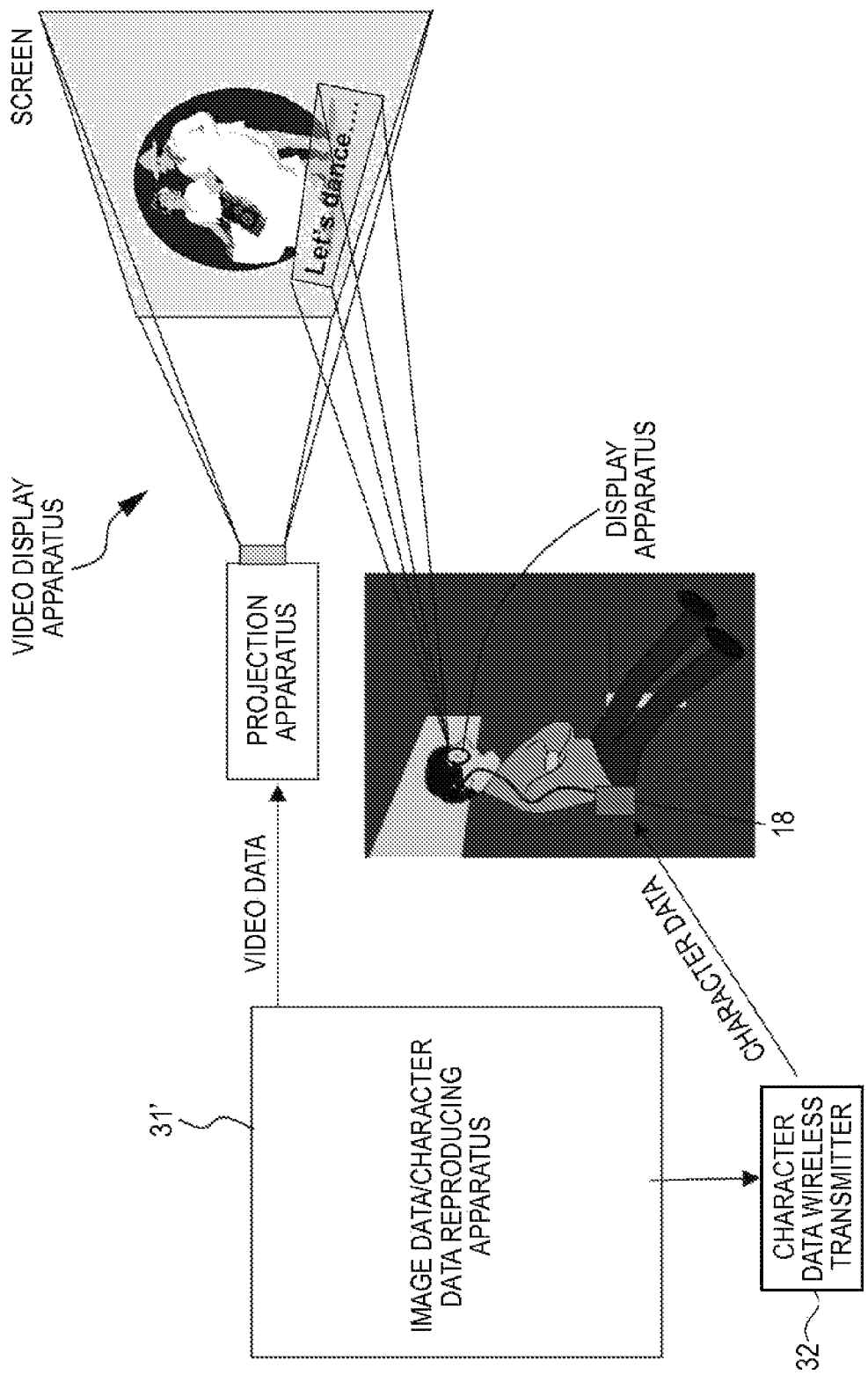
FIG. 9 is another conceptual diagram showing how to use the display apparatus according to Example 1.

Example 1 relates to a display apparatus according to the first to third embodiments of the present disclosure, more specifically to a display apparatus that displays a caption (caption display apparatus). FIG. 1A is a side view of the attachment member and the nose pad of the display apparatus according to Example 1 with the front portion and the optical device thereof cut out, and FIG. 1B is a top view of the front portion, the optical device, the attachment member, and the nose pad. FIG. 2A is a diagrammatic cross-sectional view of the front portion, the optical device, the attachment member, and the nose pad taken along the arrow A-A in FIG. 1B. FIG. 2B is a diagrammatic cross-sectional view of the first member viewed from the side where the third side surface thereof is present. FIG. 2C is a diagrammatic cross-sectional view of the first member viewed from the side where the second side surface thereof is present. Further, FIG. 3A is a diagrammatic cross-sectional view of the second member viewed from the side where the third side surface thereof is present. FIG. 3B is a diagrammatic cross-sectional view of the second member viewed from the side where the second side surface thereof is present. FIG. 3C is a diagrammatic cross-sectional view of the nose pad. FIG. 4 is a diagrammatic top view of the display apparatus according to Example 1. FIG. 5 is a diagrammatic front view of the display apparatus according to Example 1. FIG. 6 is a diagrammatic side view of the display apparatus according to Example 1. Further, FIG. 7 is a conceptual diagram of the image display apparatus in the display apparatus according to Example 1. FIGS. 8 and 9 are conceptual diagrams showing how to use the display apparatus according to Example 1. Although FIG. 5 shows the image formation devices disposed inside the temple portions, the image formation devices are in practice disposed outside the temple portions, as shown in FIGS. 4 and 6.

The display apparatus according to Example 1 is configured to be a head mounted display (HMD) and includes two image display apparatus. The display apparatus according to Example 1 or display apparatus according to any of Examples 2 to 5, which will be described later, includes (1) an eyeglass-type frame 10 worn on the head of a viewer (spectator) 20, and (2) an image display apparatus 100, 200, 300, 400, or 500 attached to the frame 10 (two image display apparatus 100, 200, 300, 400, or 500 for the right and left eyes in Examples 1 to 5).

That is, the display apparatus is a binocular-type apparatus including two image display apparatus. Each of the image display apparatus 100, 200, 300, 400, and 500 includes (A) an image formation device 111 or 211, and (B) an optical device (light guide unit) 120, 320, or 520 on which light having exited from the image formation device 111 or 211 is incident, through which the light is guided, and out of which the light exits.

The image formation device 111 or 211 is attached to the optical device (light guide unit) 120, 320, or 520. An optical system 112 or 254 is disposed between the image formation device 111 or 211 and the optical device 120, 320, or 520. A light flux collimated by the optical system 112 or 254 is incident on the optical device 120, 320, or 520, guided therethrough, and outputted therefrom. Each of the image formation devices 111 and 211 displays an image of a single color (green, for example). Each of the optical devices 120, 320, and 520 is of semitransparent type (see-through type). Specifically, at least the portion of the optical device that faces the corresponding eye of the viewer 20 (more specifically, light guide plate 121 or 321 and second deflection unit 140 or 340, which will be described later) is semitransparent (see-through).

In Example 1 or Examples 2 to 5, which will be described later, consider light rays (central light rays) that exit from the center of the image formation device 111 or 211 and pass through the nodal point of the optical system 112 or 254 on the side where the image formation device is present. Let an optical device central point be a point where a light ray to be incident on the optical device 120 or 320 at right angles is incident on the optical device 120 or 320, and 520, an X axis be an axial line that passes through the optical device central point and is parallel to the axial lines of the optical devices 120, 320, and 520, and a Y axis be an axial line that passes through the optical device central point and coincides with a normal to the optical devices 120, 320, and 520. The optical device central point is the central point of a first deflection unit 130 or 330, which will be described below.

The optical device 120 or 320 in Example 1 or Example 3, which will be described later, includes (a) a light guide plate 121 or 321 through which light incident thereon propagates while undergoing total reflection and out of which the light exits, (b) a first deflection unit 130 or 330 that deflects the light incident on the light guide plate 121 or 321 in such a way that the light incident on the light guide plate 121 or 321 undergoes total reflection therein, and (c) a second deflection unit 140 or 340 that deflects several times the light having propagated through the light guide plate 121 or 321 while undergone total reflection therein to output the light having propagated through the light guide plate 121 or 321 while undergone total reflection therein out of the light guide plate 121 or 321.

Figure 10:
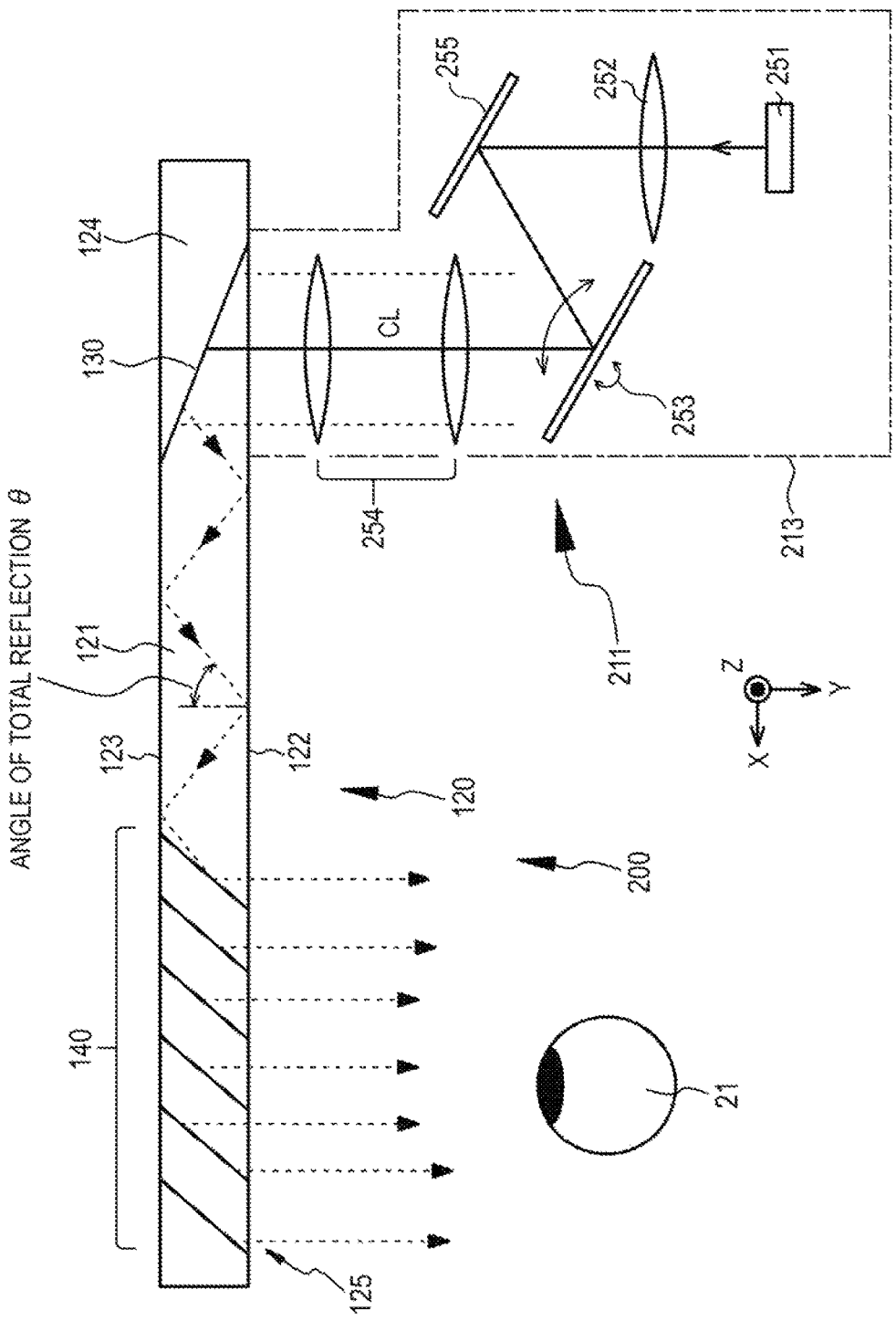
FIG. 10 is a conceptual diagram of an image display apparatus in a display apparatus according to Example 2.

In Example 1, the first deflection unit 130 and the second deflection unit 140 are disposed in the light guide plate 121. The first deflection unit 130 reflects light incident on the light guide plate 121, and the second deflection unit 140 transmits and reflects several times the light having propagated through the light guide plate 121 while undergone total reflection therein. That is, the first deflection unit 130 functions as a reflection mirror, and the second deflection unit 140 functions as a half-silvered mirror. More specifically, the first deflection unit 130 provided in the light guide plate 121 is formed of a light reflection film (a kind of mirror) that is made of aluminum (Al) and reflects the light incident on the light guide plate 121. On the other hand, the second deflection unit 140 provided in the light guide plate 121 is formed of a multilayer stacked structure in which a large number of dielectric films are stacked. The dielectric films to be stacked are formed, for example, of a $TiO_2$ film, which works as a high dielectric constant material, and an $SiO_2$ film, which works as a low dielectric constant material. JP-T-2005-521099 discloses an example of the multilayer stacked structure in which a large number of dielectric films are stacked. FIGS. 7 and 10 show a six-layer structure formed of dielectric stacked films, but the multilayer stacked structure is not limited thereto. A thin piece made of the same material as that of the light guide plate 121 is sandwiched between the dielectric stacked films. The first deflection unit 130 reflects (or diffracts) collimated light incident on the light guide plate 121 in such a way that the collimated light incident on the light guide plate 121 undergoes total reflection therein. On the other hand, the second deflection unit 140 reflects (or diffracts) several times the collimated light having propagated through the light guide plate 121 while undergone total reflection therein and outputs the collimated light from the light guide plate 121 toward the pupil 21 of the viewer 20.

The first deflection unit 130 may be formed by cutting a portion 124, where the first deflection unit 130 is provided, off the light guide plate 121 to provide the light guide plate 121 with an inclined surface where the first deflection unit 130 should be formed, forming a light reflection film on the inclined surface in a vacuum evaporation process, and gluing the portion 124 having been cut off the light guide plate 121 to the first deflection unit 130. The second deflection unit 140 may be formed by producing a multilayer stacked structure in which a large number of films made of the same material as that of the light guide plate 121 (glass, for example) and a large number of dielectric films (which can, for example, be deposited in a vacuum evaporation process) are stacked, cutting a portion 125, where the second deflection unit 140 is provided, off the light guide plate 121 to form an inclined surface, gluing the multilayer stacked structure onto the inclined surface, and polishing or otherwise processing the multilayer stacked structure to shape the exterior thereof. The optical device 120 having the first deflection unit 130 and the second deflection unit 140 provided in the light guide plate 121 can thus be produced.

In Example 1 or Examples 2 to 4, which will be described later, the light guide plate 121 or 321, which is made of an optical glass or plastic material, has two surfaces (first surface 122 or 322 and second surface 123 or 323) parallel to each other and extending in parallel to the direction in which light travels through the light guide plate 121 or 321 while undergoing total reflection therein (X axis). The first surface 122 or 322 and the second surface 123 or 323 face each other. After the collimated light is incident on the first surface 122 or 322, which corresponds to the light incident surface, and undergoes total reflection in the light guide plate 121 or 321, the light exits through the first surface 122 or 322, which corresponds to the light exiting surface. The configuration of the light guide plate 121 or 321 is not limited to that described above, but the second surface 123 or 323 may form the light incident surface, and the first surface 122 or 322 may form the light exiting surface.

Figure 11:
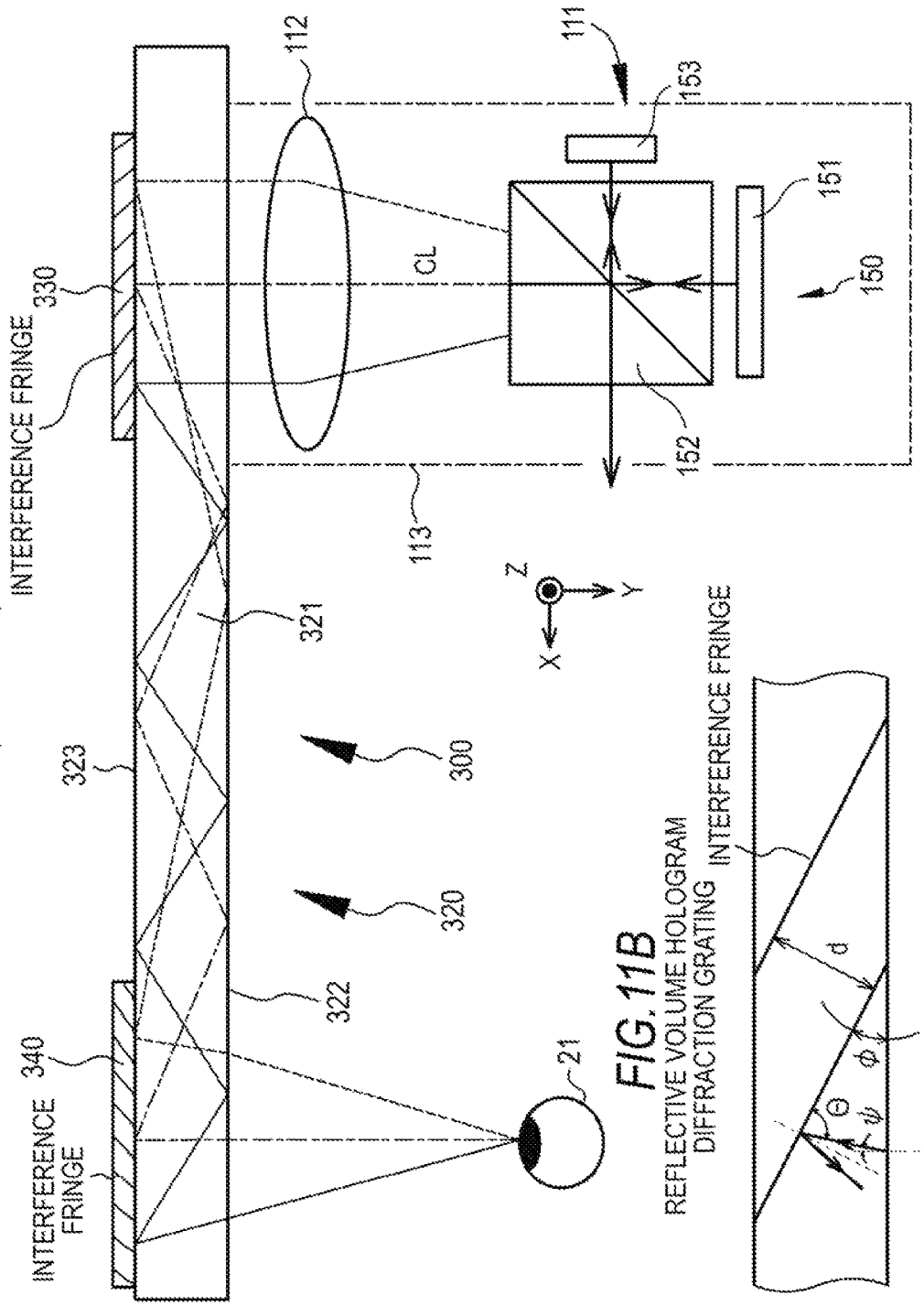
FIGS. 11A and 11B are conceptual diagrams of an image display apparatus in a display apparatus according to Example 3.

In Example 1 or Example 3, which will be described later, the image formation device 111 is a first-configuration image formation device and has a plurality of pixels arranged in a two-dimensional matrix. Specifically, the image formation device 111 includes a reflective spatial light modulator 150 and a light source 153 formed of a light emitting diode that emit green light. The entire image formation device 111 is accommodated in an enclosure 113 (indicated by long-dashed and short-dashed line in FIG. 7 or 11), and the enclosure 113 has an opening (not shown) through which the light from the optical system (collimated light outputting optical system, collimator optical system) 112 exits. The reflective spatial light modulator 150 includes a liquid crystal display device (LCD) 151 formed of an LCOS device as a light valve and a polarizing beam splitter 152 that reflects part of the light from the light source 153, guides the reflected light to the liquid crystal display device 151, and transmits part of the light reflected off the liquid crystal display device 151 to the optical system 112. The liquid crystal display device 151 has a plurality of (640×480, for example) pixels (liquid crystal cells) arranged in a two-dimensional matrix. The polarizing beam splitter 152 has a known configuration and structure. Unpolarized light emitted from the light source 153 impinges on the polarizing beam splitter 152. In the polarizing beam splitter 152, a P-polarized light component passes therethrough and exits out of the system. On the other hand, an S-polarized light component is reflected in the polarizing beam splitter 152, incident on the liquid crystal display device 151, reflected in the liquid crystal display device 151, and outputted from the liquid crystal display device 151. The light outputted from the liquid crystal display device 151 is configured as follows: light outputted from pixels that display "white" contains a large amount of P-polarized light component, and light outputted from pixels that display "black" contains a large amount of S-polarized light component. The P-polarized light component in the light that is outputted from the liquid crystal display device 151 and impinges on the polarizing beam splitter 152 passes through the polarizing beam splitter 152 and is guided to the optical system 112. On the other hand, the S-polarized light component is reflected in the polarizing beam splitter 152 and returns to the light source 153. The optical system 112 is formed, for example, of a convex lens, and the image formation device 111 (more specifically, liquid crystal display device 151) is disposed at a focal point (position) of the optical system 112 so that collimated light is produced. The enclosure 113 is attached to the optical device (light guide unit) 120.

The frame 10 is formed of
a front portion 11 disposed in front of the viewer 20,
two temple portions 13 extending from both ends of the front portion 11 (specifically, two temple portions 13 pivotally attached to both ends of the front portion 11 via hinges 12),
an end cover (also called front cell, ear pad) 14 attached to the tip of each of the temple portions 13,
a nose pad 80, and
an attachment member 40.
That is, the frame 10 basically has substantially the same structure as that of a typical pair of eyeglasses. The frame 10 is made of a metal or plastic material.

The attachment member 40 is attached to a central section 11' of the front portion 11 with screws (not shown), and the optical devices 120 are attached to the attachment member 40 with screws (not shown). Further, the nose pad 80 is so attached to the attachment member 40 that the nose pad 80 is movable upward and downward. In addition, the optical devices 120 are so attached to the attachment member 40 that the optical devices 120 pivotally move around an axial line parallel to the line connecting the centers of the eyeballs 21 of the viewer 20 (X direction).

The attachment member 40 made of a plastic material is formed of a first member 50 having a box-like shape and a second member 60. The first member 50 has at least a first side surface 51, a second side surface 52 extending from one side end of the first side surface 51, a third side surface 53 extending from the other side end of the first side surface 51, a fourth side surface 54 connecting the second side surface 52 and the third side surface 53 to each other, and a bottom surface 55. In Example 1, the first member 50 further has a top surface 56. The first side surface 51 and the fourth side surface 54 face each other, and the second side surface 52 and the third side surface 53 face each other. The second member 60 has at least a first side surface 61, a second side surface 62 extending from one side end of the first side surface 61, and a third side surface 63 extending from the other side end of the first side surface 61. The second side surface 62 and the third side surface 63 face each other.

The first side surface 51 of the first member 50 is attached to the central section 11' of the front portion 11. The nose pad 80 is so attached to the fourth side surface 54 of the first member 50 that the nose pad 80 is movable upward and downward. Specifically, the fourth side surface 54 of the first member 50 has a groove 57 extending in the up-down direction formed therein, and the nose pad 80 is formed of pad portions 81 and a pad attachment portion 82, which is made of a plastic material and movable upward and downward along the groove 57. On the other hand, the optical devices 120 are attached to the first side surface 61 of the second member 60. The optical devices 120 may be attached to the attachment member 40 (or first side surface 61 of second member 60) with screws (not shown). In some cases, cutouts are provided in the attachment member 40 (or first side surface 61 of second member 60) and the optical devices 120 may be fit in the cutouts, or each of the optical devices 120 may be bonded to the first side surface 61 of the second member 60 with a double-sided adhesive sheet.

With the second side surface 62 of the second member 60 facing the second side surface 52 of the first member 50, and the third side surface 63 of the second member 60 facing the third side surface 53 of the first member 50, the second member 60 is so attached to the first member 50 that the second member 60 pivotally moves around an axial line parallel to the line connecting the centers of the eyeballs 21 of the viewer 20.

Specifically, through holes 59A and 59B are formed through the second side surface 52 and the third side surface 53 of the first member 50 respectively, and through holes 65A and 65B are formed through the second side surface 62 and third side surface 63 of the second member 60 respectively. A first connecting member 71 is inserted into the through hole 59A formed through the second side surface 52 of the first member 50 and the through hole 65A formed through the second side surface 62 of the second member 60, and a second connecting member 72 is inserted into the through hole 59B formed through the third side surface 53 of the first member 50 and the through hole 65B formed through the third side surface 63 of the second member 60. The first connecting member 71 and the second connecting member 72 are disposed along the axial line parallel to the line connecting the centers of the eyeballs 21 of the viewer 20. In some cases, the first connecting member 71 and the second connecting member 72 may be integrated with each other. That is, the first connecting member 71 and the second connecting member 72 may be formed, for example, of a single metal round bar. The first connecting member 71 and the second connecting member 72 have structures that prevent themselves from coming off the through holes 59A, 59B, 65A, and 65B.

Further, a latch member 74, which engages with the pad attachment portion 82, is attached to the bottom surface 55 of the first member 50. Locking portions 76A and 76B, which engage with the bottom of the second side surface 62 and the bottom of the third side surface 63 of the second member 60, are provided on the bottom surface 55 of the first member 50. The latch member 74 is formed, for example, of a plate spring and is fixed to the bottom surface 55 of the first member 50 with screws. A protrusion (latch receiver) 84 is provided at a single location on the surface 83 of the pad attachment portion 82 that faces the first side surface 51 of the first member 50, and a plurality of recesses 75 are provided in the latch member 74. The nose pad 80 can be positioned relative to the attachment member 40 and so attached to the attachment member 40 that the nose pad 80 is movable upward and downward relative to the attachment member 40 by fitting the protrusion 84 on the pad attachment portion 82 in one of the recesses 75 in the latch member 74. The width of the surface 83 of the pad attachment portion 82 is wider than the width of the groove 57 so that the pad attachment portion 82 will not come off the groove 57 when the pad attachment portion 82 moves upward or downward along the groove 57. Each of the locking portions 76A and 76B is also formed, for example, of a plate spring and fixed to the bottom surface 55 of the first member 50 with screws. Cutouts (lock receivers) 64A and 64B are provided along the bottom of the second side surface 62 and the bottom of the third side surface 63 of the second member 60, which engage with the locking portions 76A and 76B respectively, whereby the optical devices 120 can be positioned relative to the attachment member 40 and so attached to the attachment member 40 that the optical devices 120 pivotally move with respect to the attachment member 40.

Further, wiring lines (such as signal lines and power source lines) 15 extending from each of the image formation devices 111A and 111B along the corresponding temple portion 13 pass through the corresponding end cover 14, further extend outward from the tip of the end cover 14, and are connected to a control unit (control circuit, control unit) 18. Each of the image formation devices 111A and 111B includes a headphone unit 16, and headphone wiring lines 17 extending from each of the image formation devices 111A and 111B along the corresponding temple portion 13 pass through the corresponding end cover 14 and further extend from the tip of the end cover 14 to the headphone unit 16. More specifically, the headphone wiring lines 17 further extend from the tip of the corresponding end cover 14 to the headphone unit 16 in such a way that the headphone wiring lines 17 follow the backside of the auricle (ear capsule). The configuration allows the user who wears the display apparatus to give an impression to other people that the headphone units 16 and the headphone wiring lines 17 are neatly disposed.

The wiring lines (such as signal lines and power source lines) 15 are connected to the control unit (control circuit) 18, as described above. An image signal (character data, for example) is wirelessly sent to the control unit 18, where the image signal (character data) is so processed that an image carried by the image signal is displayed (a caption is displayed, for example). The control unit 18 can be formed of a known circuit.

When the display apparatus is used, for example, in a theater, the display apparatus may display an image containing descriptions for describing the contents, progress, backgrounds, and other information on a play or any other performing art. In this case, however, it is sometimes necessary to set the distance to a virtual image at a desired value. That is, not only the distance between an object being viewed and a viewer (spectator) but also the distance to a virtual image (characters, for example) displayed by the image display apparatus change in accordance with the position where the play viewer sits. It is therefore necessary to optimize the distance to the virtual image in accordance with the position of the play viewer. In this case, the distance to the virtual image can be optimized in accordance with the position of the play viewer by optimizing the viewer's convergence angle corresponding to the distance from the display apparatus to the object being viewed. Specifically, for example, the convergence angle can be adjusted by moving the optical axes of the image formation devices along with the optical axes of the optical systems in the horizontal direction by using a moving device relative to and in accordance with the position of the viewer. The convergence angle can alternatively be adjusted by pivoting the image formation devices along with the optical systems by using a pivoting device in accordance with the position of the viewer so that the angle of incidence of the collimated light that exits from each of the optical systems and enters the corresponding optical device is changed relative to the optical device. The convergence angle can still alternatively be adjusted by controlling an image signal to the image formation device that forms at least one of the image display apparatus.

Alternatively, the viewer (spectator, user) can also set the distance to a virtual image at a desired value or set the position of the virtual image at a desired position. Specifically, the viewer can operate switches and buttons disposed on the control unit 18 to set a virtual image formed at a desired distance or in a desired position. For example, when the background changes, the distance to a virtual image or the position thereof can be arbitrarily changed. The changing operation can be automatically carried out based on an image signal or by the viewer as appropriate anytime while the viewer is looking at an object being viewed. To this end, specifically, the control unit 18 may add a display position correction signal (convergence angle control signal) to an image signal.

An image signal is formed of digitized data having been created in advance before being displayed. The position where an image is displayed may be any position where the image does not interfere with an object being viewed. Further, an image to be displayed is wirelessly sent from a character data wireless transmitter 32 to the control unit 18 under the control of a computer (not shown) provided in a character data reproducing apparatus 31 or an image data/character data reproducing apparatus 31' based on a predetermined schedule, allocation of time, or any other factor or in accordance with the progress of an object being viewed, as described above.

In the display apparatus according to Example 1, when an image signal containing character data is configured to also contain luminance data and chroma data on the characters to be displayed, the image signal reliably prevents the characters in an image (captions, for example) from being hardly recognized depending on the background of the characters. The luminance data can, for example, be so produced that it corresponds to the luminance of a predetermined area including an object being viewed (such as actor or background) (for example, area corresponding to lower one-third of entire stage) through the image display apparatus. The chroma data can be so produced that it corresponds to the chroma of the predetermined area including the object being viewed through the image display apparatus. In particular, when the brightness of the screen, the stage, or any other platform viewed through a semitransparent (see-through) optical device is not balanced within a fixed tolerance with the brightness and the color of characters displayed in the optical device, it is sometimes difficult to view captions, the screen, the stage, or any other platform in a satisfactory manner. In contrast, setting the brightness and the color of characters to be displayed to be comparable with those of the screen, the stage, or any other platform allows the characters to be recognized in a satisfactory manner. That is, it is possible to reliably prevent characters, for example, for describing an object being viewed by the viewer (spectator) from being hardly recognized depending on the background of the characters. When the display apparatus according to Example 1 is used, for example, to assist a play viewer, characters associated with an object being viewed (such as descriptions of situations and backgrounds of the play, descriptions of actors, and conversations among actors) may be displayed at appropriate timing in the image display apparatus 100, 200, 300, 400, or 500. Specifically, for example, character data may be sent to the image display apparatus 100, 200, 300, 400, or 500 in response to operator's operation or under the control of a computer or any other controller in accordance with the progress of the play and characters, and the image display apparatus 100, 200, 300, 400, or 500 may display the characters.

Further, a virtual image displayed in a fixed position is believed to cause eye fatigue because a fixed focal point reduces the movement of the eyeballs. The eye fatigue can be reduced by changing the distance to a virtual image appropriately or shifting the position of the virtual image. That is, the positions of virtual images formed by the two optical devices or the distances from the two optical devices to virtual images formed by the two optical devices (distances to virtual images) may be changed with time. Specifically, for example, the horizontal position of an image may be changed once in every 5 minutes or any suitable period by two pixels in the positive direction in the image formation device, for example, for 1 minute or any suitable period, and then the changed position may be put back to the original position.

As described above, the display apparatus according to Example 1 includes the attachment member 40, to which the front portion 11, the nose pad 80, and the optical devices 120 are attached. Since the nose pad 80 is so attached to the attachment member 40 that the nose pad 80 is movable upward and downward, the relative positional relationship (relationship in up-down direction) between the viewer 20 and the optical devices 120 can be readily changed. Alternatively, since the optical devices 120 are so attached to the attachment member 40 that the optical devices 120 pivotally move around an axial line parallel to the line connecting the centers of the eyeballs 21 of the viewer 20, the relative positional relationship (relationship in angular direction) between the viewer 20 and the optical devices 120 can be readily changed. As a result, the position of a virtual image displayed in the image display apparatus can be readily changed, whereby the viewer 20 can view an outside-world image superimposed with an image, such as a caption, displayed in the image display apparatus with the position of the image (virtual image displayed in image display apparatus) readily optimized relative to the outside-world image (real image).

EXAMPLE 2

Figure 12:
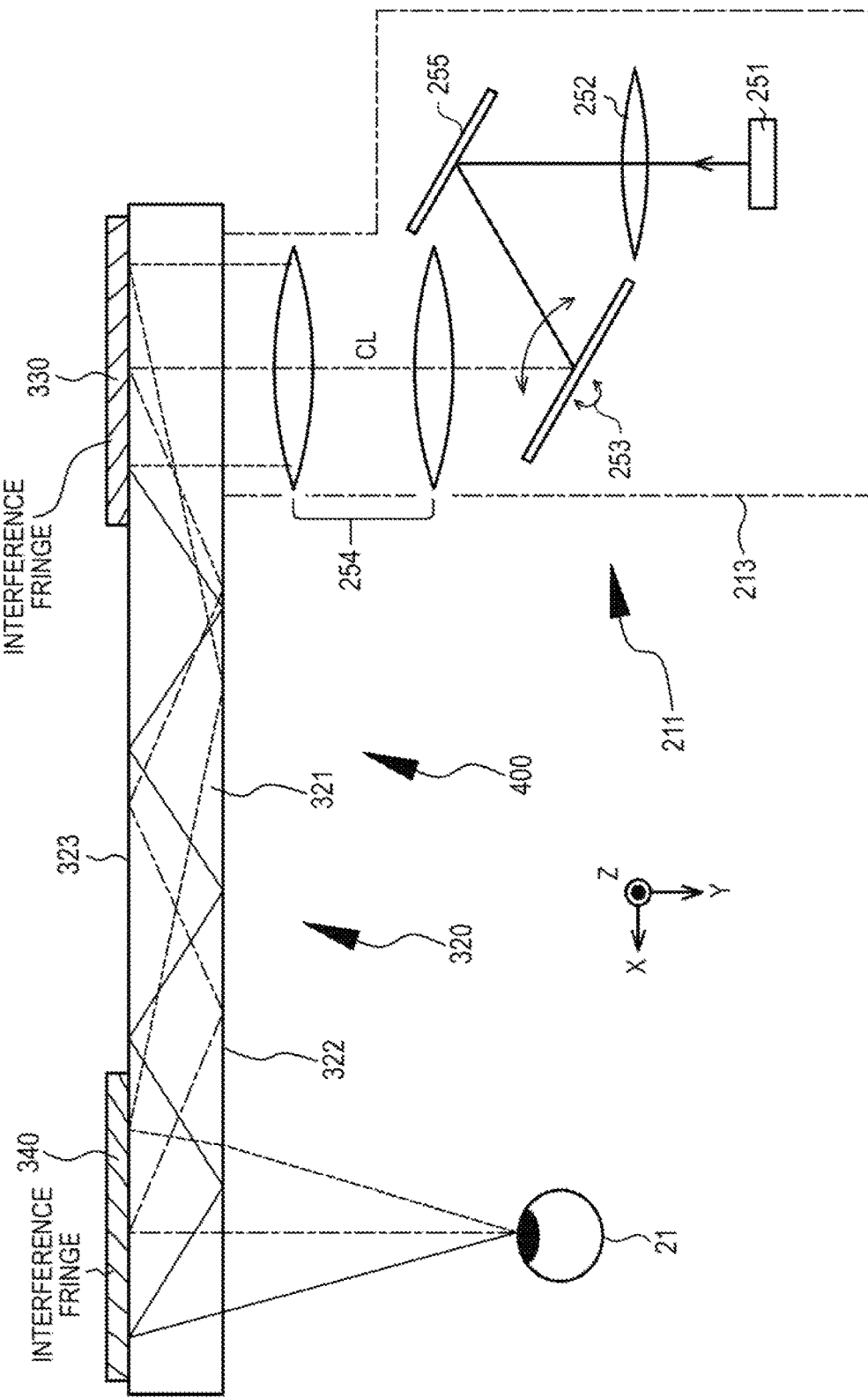
FIG. 12 is a conceptual diagram of an image display apparatus in a display apparatus according to Example 4.

Example 2 is a variation of the image display apparatus in Example 1. As shown in FIGS. 10 and 12, which are conceptual views of image display apparatus 200 and 400 in display apparatus according to Example 2 and Example 4, which will be described later, an image formation device 211 is the second-configuration image formation device. That is, the image formation device 211 includes a light source 251 and a scan unit 253 that causes collimated light emitted from the light source 251 to scan a target. More specifically, the image formation device 211 includes the light source 251, a collimator optical system 252 that collimates light emitted from the light source 251, the scan unit 253 that causes the collimated light having exited from the collimator optical system 252 to scan a target, and an optical system (relay optical system) 254 that relays the collimated light caused by the scan unit 253 to scan a target and outputs the scanning light.

The entire image formation device 211 is accommodated in an enclosure 213 (indicated by long-dashed and short-dashed line in FIGS. 10 and 12), and the enclosure 213 has an opening (not shown), through which the light from the relay optical system 254 exits. The enclosure 213 is attached to an optical device (light guide unit) 320.

The light source 251 is formed of a light emitting device that emits green light. The light emitted from the light source 251 is incident on the collimator optical system 252 having positive optical power as a whole and exits therethrough in the form of collimated light. The collimated light is reflected off a total reflection mirror 255 and caused to scan a target horizontally and vertically by the scan unit 253, which is formed of a MEMS device that has a two-dimensionally pivotal micromirror and can cause the incident collimated light to scan a target two-dimensionally, whereby the collimated light forms a kind of two-dimensional image and produces virtual pixels (the number of which can be the same as that in Example 1, for example). The light fluxes from the virtual pixels pass through the relay optical system (collimated light outputting optical system) 254 formed of a known relay optical system, and the collimated optical fluxes enter the optical device 120.

The optical device 120, on which the collimated light fluxes are incident through the relay optical system 254, through which the light fluxes are guided, and out of which the light fluxes exit, has the same configuration and structure as those of the optical device described in Example 1, and no detailed description of the optical device 120 will therefore be made. Further, the display apparatus according to Example 2 has the same configuration and structure as those of the display apparatus according to Example 1 except the differences described above, and no detailed description of the display apparatus according to Example 2 will therefore be made.

EXAMPLE 3

Example 3 is another variation of the image display apparatus in Example 1. FIG. 11A is a conceptual diagram of an image display apparatus 300 in a display apparatus according to Example 3. FIG. 11B is an enlarged, partial, diagrammatic cross-sectional view showing part of a reflective volume hologram diffraction grating. In Example 3, an image formation device 111 is the first-configuration image formation device, as in Example 1. An optical device 320 has the same basic configuration and structure as those of the optical device 120 in Example 1 but differs therefrom in terms of the configuration and structure of the first and second deflection units.

In Example 3, the first and second deflection units are disposed on a surface of a light guide plate 321 (specifically, second surface 323 of light guide plate 321). The first deflection unit diffracts the light incident on the light guide plate 321, and the second deflection unit diffracts several times the light having propagated through the light guide plate 321 while undergone total reflection therein. Each of the first and second deflection units is formed of a diffraction grating, specifically, a reflective diffraction grating element, more specifically, a reflective volume hologram diffraction grating. In the following description, the first deflection unit formed of a reflective volume hologram diffraction grating is called a "first diffraction grating member 330" for convenience, and the second deflection unit formed of a reflective volume hologram diffraction grating is called a "second diffraction grating member 340" for convenience.

In Example 3 or Example 4, which will be described later, each of the first diffraction grating member 330 and the second diffraction grating member 340 has a configuration in which single-layer diffraction grating films are stacked. In the diffraction grating layers made of a photopolymer material, interference fringes corresponding to the respective types of wavelength band (or wavelength) are formed by using a known method. The interference fringes formed in the diffraction grating layers (diffraction optical elements) are linear, arranged at fixed intervals, and parallel to the Z axis. The axial line of each of the first diffraction grating member 330 and the second diffraction grating member 340 is parallel to the X axis, and a normal to each of the first diffraction grating member 330 and the second diffraction grating member 340 is parallel to the Y axis.

FIG. 11B is an enlarged, partial, diagrammatic cross-sectional view showing a reflective volume hologram diffraction grating. Interference fringes having an inclination angle $\varphi$ are formed in the reflective volume hologram diffraction grating. The inclination angle $\varphi$ refers to the angle between one of the surfaces of the reflective volume hologram diffraction grating and the interference fringes. The interference fringes are formed in the reflective volume hologram diffraction grating and extend to the surfaces thereof. The interference fringes satisfy the Bragg condition. The Bragg condition refers to a condition expressed by the following expression (A). In Expression (A), m represents a positive integer, $\lambda$ represents the wavelength of light, d represents the interval between grating surfaces (distance in normal direction between virtual planes including interference fringes), and $\Theta$ represents the complementary angle to the angle of incidence of light incident on the interference fringes. When light is incident on the diffraction grating member at an angle of incidence $\Psi$ and passes therethrough, the relationship among $\Theta$, the inclination angle $\varphi$, and the angle of incidence $\Psi$ are expressed by the following expression (B):

$$m \times \lambda = 2 \times d \times \sin(\Theta) \tag{A}$$

$$\Theta = 90° - (\varphi + \Psi) \tag{B}$$

The first diffraction grating member 330 is disposed on (glued to) the second surface 323 of the light guide plate 321, as described above, and diffractively reflects the collimated light incident on the light guide plate 321 in such a way that the collimated light incident on the light guide plate 321 through the first surface 322 undergoes total reflection in the light guide plate 321. Further, the second diffraction grating member 340 is disposed on (glued to) the second surface 323 of the light guide plate 321, as described above, diffractively reflects several times the collimated light having propagated through the light guide plate 321 while undergone total reflection therein, and outputs the collimated light from the light guide plate 321 through the first surface 322.

The collimated light also propagates through the light guide plate 321 while undergoing total reflection therein and exits out of the light guide plate 321, as in the case described above. Since the light guide plate 321 is thin and the optical path along which the light travels through the light guide plate 321 is long, the number of total reflection until the light reaches the second diffraction grating member 340 varies with the viewing angle. More specifically, the collimated light incident on the light guide plate 321 undergoes total reflection as follows: The number of total reflection of the collimated light incident on the light guide plate 321 at an angle that causes the collimated light to approach the second diffraction grating member 340 is smaller than the number of total reflection of the collimated light incident on the light guide plate 321 at an angle that causes the collimated light not to approach the second diffraction grating member 340. The reason for this can be explained by considering collimated light to be diffractively reflected off the first diffraction grating member 330 as follows: When the collimated light incident on the light guide plate 321 at an angle that causes the collimated light approaches the second diffraction grating member 340 is compared with the collimated light incident on the light guide plate 321 at an angle that causes the collimated light behave otherwise, the former collimated light that propagates through the light guide plate 321 and impinges on the inner surface thereof forms a smaller angle with respect to a normal to the light guide plate 321 than the latter collimated light. Further, the shape of the interference fringes formed in the second diffraction grating member 340 and the shape of the interference fringes formed in the first diffraction grating member 330 are symmetric with respect to a virtual plane perpendicular to the axial line of the light guide plate 321.

A light guide plate 321 in Example 4, which will be described later, also basically has the same configuration and structure as the configuration and structure of the light guide plate 321 described above. The display apparatus according to Example 3 has the same configuration and structure as those of the display apparatus according to Examples 1 and 2 except the difference described above, and no detailed description of the display apparatus according to Example 3 will therefore not be made.

EXAMPLE 4

Example 4 is a variation of the image display apparatus in Example 3. FIG. 12 is a conceptual diagram showing an image display apparatus in a display apparatus according to Example 4. A light source 251, a collimator optical system 252, a scan unit 253, a collimated light outputting optical system (optical system, relay optical system 254), and other components in an image display apparatus 400 according to Example 4 have the same configurations and structures (second-configuration image formation apparatus) as those in Example 2. An optical device 320 in Example 4 has the same configuration and structure as those of the optical device 320 in Example 3. The display apparatus according to Example 4 substantially has the same configuration and structure as those of the display apparatus according to Examples 1 and 2 except the differences described above, and no detailed description of the display apparatus according to Example 4 will therefore be made.

EXAMPLE 5

Figure 13:
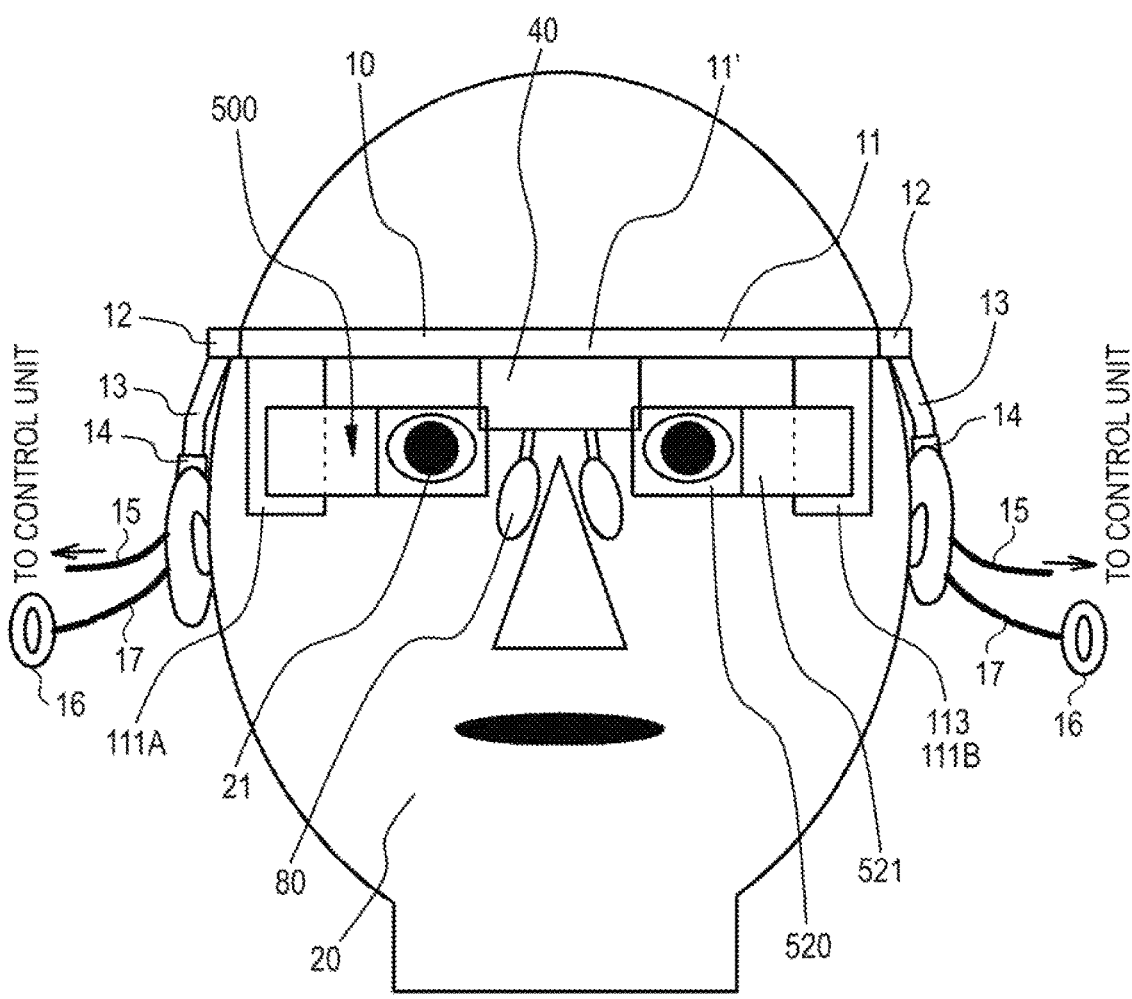
FIG. 13 is a front diagrammatic view showing a display apparatus according to Example 5.
Figure 14:
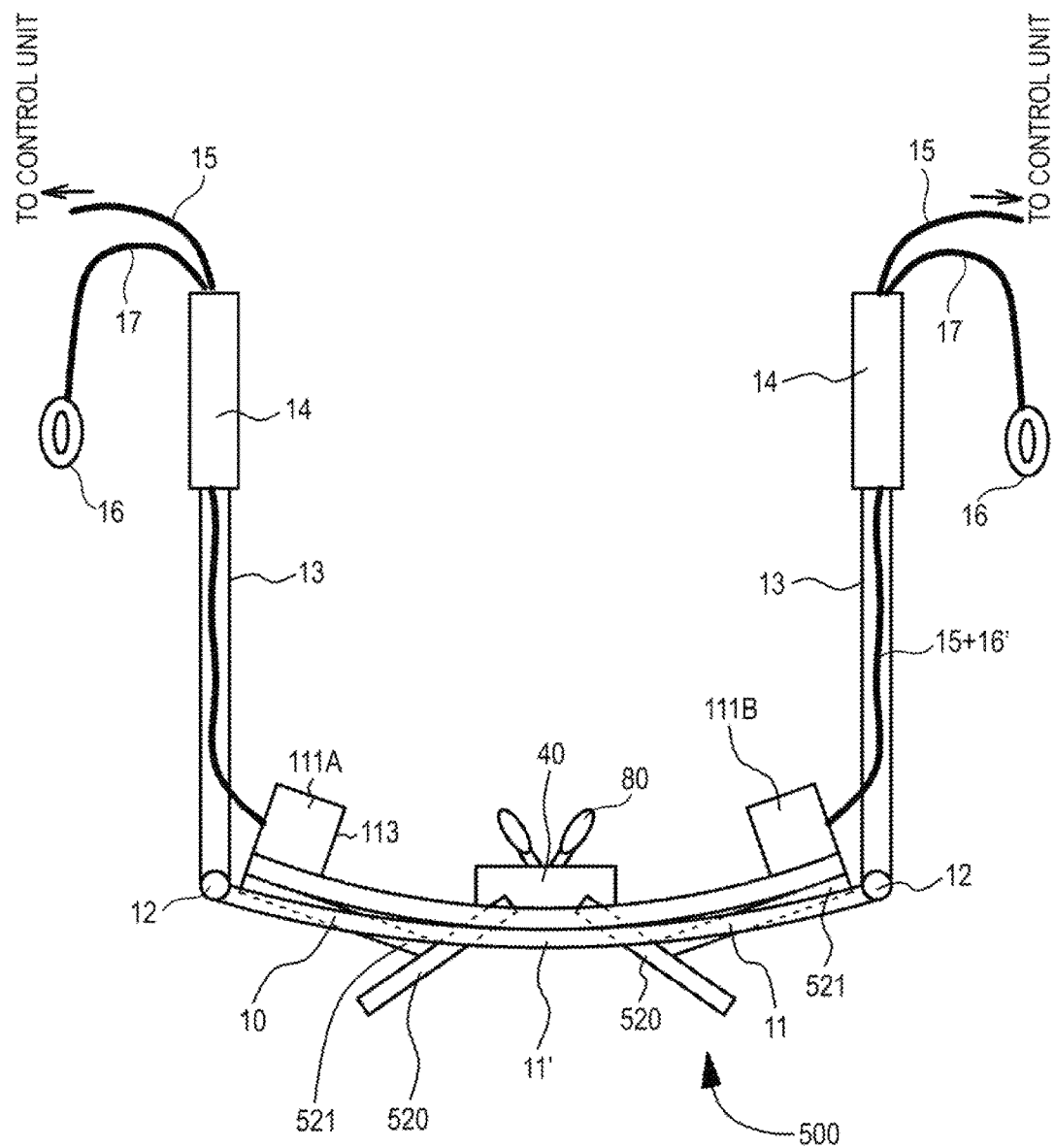
FIG. 14 is a top diagrammatic view showing the display apparatus according to Example 5.

Example 5 is another variation of the image display apparatus in Example 1. FIG. 13 is a front diagrammatic view showing a display apparatus according to Example 5, and FIG. 14 is a top diagrammatic view showing the display apparatus according to Example 5.

In Example 5, optical devices 520 are formed of half-silvered mirrors on which light fluxes having exited from image formation devices 111A and 111B are incident and out of which the light fluxes exit toward the pupils 21 of the viewer 20. In Example 5, the light fluxes having exited from the image formation devices 111A and 111B propagate through transparent members 521, such as glass plates or plastic plates, and enter the optical devices 520 (half-silvered mirrors). Alternatively, the light fluxes may propagate in the air and enter the optical devices 520. Further, each of the image formation devices can be the image formation device 211 described in Example 2.

The image formation devices 111A and 111B are attached to the second member 60 with screws or any other fasteners. The members 521 are attached to the image formation devices 111A and 111B, and the optical devices 520 (half-silvered mirrors) are attached to the members 521. The display apparatus according to Example 5 substantially has the same configuration and structure as those of the display apparatus according to Examples 1 to 4 except the differences described above, and no detailed description of the display apparatus according to Example 5 will therefore be made.

The present disclosure has been described with reference preferred Examples, but the present disclosure is not limited thereto. The configurations and structures of the display apparatus and the image display apparatus described in Examples are presented by way of example and can be changed as appropriate, and the display apparatus can also be used to display images and videos. In Examples, the nose pad is so attached to the attachment member that the nose pad is movable upward and downward, and the optical devices are so attached to the attachment member that the optical devices pivotally move around an axial line parallel to the line connecting the centers of the eyeballs of the viewer (X direction). Alternatively, in the display apparatus, the optical devices may be so attached to the attachment member that the optical devices are movable upward and downward, or the nose pad may be so attached to the attachment member that the nose pad pivotally move around an axial line parallel to the line connecting the centers of the eyeballs of the viewer (X direction). In some cases, the display apparatus can be of single lens type including a single image display apparatus. Further, for example, the front portion may be integrated with the two temple portions. Moreover, for example, a surface relief hologram (see US Patent No. 20040062505A1) may be disposed on the light guide plate. In the optical device 320 in Example 3 or 4, each of the diffraction grating elements can be formed of a transmissive diffraction grating element, or one of the first and second deflection units can be formed of a reflective diffraction grating element and the other can be formed of a transmissive diffraction grating element. Alternatively, each of the diffraction grating elements can be a reflective brazed diffraction grating element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A display apparatus comprising:
 a frame;
 a light guide;
 an attachment member; and
 a nose pad;
 wherein
 the attachment member includes a first member and a second member attached to the first member,
 the first member includes a rectangular shaped hollow portion with an opening in a first side and a groove in a second side that is across from the first side,
 at least a portion of the groove and a portion of the opening overlap one another along a plane that is parallel to a plane connecting centers of eyeballs of a viewer,
 a first portion of an inner bottom surface of the rectangular shaped hollow portion that is closer to the opening than the groove includes at least one locking protrusion,
 a latch member is attached to a second portion of the inner bottom surface of the rectangular shaped hollow portion that is closer to the groove than the opening,
 a portion of the second member extends into the opening in the rectangular shaped hollow portion and includes locking recesses to engage with the at least one locking protrusion such that the second member is pivotally movable relative to the first member around an axial line parallel to a line connecting the centers of eyeballs of the viewer,
 a top portion of the first member above the opening is attached to the frame,
 the nose pad includes a portion that extends into the groove to attach to the latch member and is movable upward and downward with respect to the first member, and
 the light guide is fixed to the second member and is moveable relative to the frame by moving the second member relative to the first member by engaging different ones of the locking recesses with the at least one locking protrusion.

2. The display apparatus of claim 1, wherein the second member is pivotally movable relative to the first member such that the light guide is pivotally movable around an axial line parallel to the line connecting centers of eyeballs of the viewer.

3. The display apparatus of claim 1, wherein the first member has a first side surface, a second side surface extending from one side end of the first side surface, a third side surface extending from the other side end of the first side surface, and a fourth side surface connecting the second side surface and the third side surface to each other.

4. The display apparatus of claim 3, wherein the first side surface of the first member includes the top portion that is attached to a central section of the frame.

5. The display apparatus of claim 4, wherein the groove is in the fourth side surface of the first member.

6. The display apparatus of claim 5, wherein the second member includes a first side surface, a second side surface extending from one side end of the first side surface, and a third side surface extending from the other side end of the first side surface.

7. The display apparatus of claim 6, wherein the light guide is attached to the first side surface of the second member, and wherein the first side surface is external to the rectangular shaped hollow portion.

8. The display apparatus of claim 7, wherein the second side surface of the second member faces the second side surface of the first member, and the third side surface of the second member faces the third side surface of the first member.

9. The display apparatus of claim 8,
wherein through holes are formed through the second and third side surfaces of the first member and through holes are formed through the second and third side surfaces of the second member,
a first connecting member is inserted into the through hole formed through the second side surface of the first member and the through hole formed through the second side surface of the second member,
a second connecting member is inserted into the through hole formed through the third side surface of the first member and the through hole formed through the third side surface of the second member, and
the first and second connecting members are disposed along an axial line parallel to the line connecting the centers of the eyeballs of the viewer.

10. The display apparatus of claim 8,
wherein
the nose pad is formed of pad portions and a pad attachment portion, and
the pad attachment portion is movable upward and downward along the groove.

11. The display apparatus of claim 10,
wherein the latch member engages with the pad attachment portion.

12. The display apparatus of claim 1,
wherein the light guide is a half-silvered component.

13. The display apparatus of claim 1,
the latch member includes a plurality of connecting portions in the rectangular hollow portion behind the groove,
the nose pad includes a pad attachment portion with a latch receiver, and
the pad attachment portion is movable upward and downward along the groove by engaging the latch receiver portion with one of the plurality of connecting portions.

14. The display apparatus of claim 13, wherein the plurality of connecting portions are recesses in the latch member and the latch receiver is a protrusion on the pad attachment portion.

* * * * *